US012586261B2

(12) United States Patent
Fuse

(10) Patent No.: US 12,586,261 B2
(45) Date of Patent: Mar. 24, 2026

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Koji Fuse, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 161 days.

(21) Appl. No.: 18/584,076

(22) Filed: Feb. 22, 2024

(65) Prior Publication Data

US 2024/0331212 A1 Oct. 3, 2024

(30) Foreign Application Priority Data

Mar. 27, 2023 (JP) ................................ 2023-049562

(51) Int. Cl.

| | |
|---|---|
| ***G06T 7/00*** | (2017.01) |
| ***G06T 5/20*** | (2006.01) |
| ***G06T 7/50*** | (2017.01) |
| ***G06T 11/00*** | (2006.01) |
| ***G06V 10/141*** | (2022.01) |
| ***G06V 10/44*** | (2022.01) |

(52) U.S. Cl.

CPC ................ *G06T 11/00* (2013.01); *G06T 5/20* (2013.01); *G06T 7/50* (2017.01); *G06V 10/141* (2022.01); *G06V 10/44* (2022.01)

(58) Field of Classification Search

CPC .................... G06V 10/141; G06T 2207/10152
USPC .......................................................... 345/581
See application file for complete search history.

(56) References Cited

U.S. PATENT DOCUMENTS

| | | | | |
|---|---|---|---|---|
| 5,774,222 | A * | 6/1998 | Maeda | G01N 21/8806 250/548 |
| 9,571,817 | B2 | 2/2017 | Mayumi | |
| 9,773,304 | B2 | 9/2017 | Mayumi | |
| 2007/0273686 | A1* | 11/2007 | Watanabe | G06T 15/506 345/419 |
| 2015/0358602 | A1* | 12/2015 | Mayumi | H04N 23/56 348/46 |
| 2017/0098300 | A1 | 4/2017 | Mayumi | |
| 2018/0247393 | A1* | 8/2018 | Ohga | H04N 23/698 |
| 2024/0127018 | A1* | 4/2024 | Ono | H04N 1/2323 |

FOREIGN PATENT DOCUMENTS

| | | | |
|---|---|---|---|
| JP | 2003-240539 | A | 8/2003 |
| JP | 2012-122870 | A | 6/2012 |
| JP | 2015-232476 | A | 12/2015 |
| JP | 2019-191105 | A | 10/2019 |

* cited by examiner

*Primary Examiner* — Samantha (Yuehan) Wang
(74) *Attorney, Agent, or Firm* — Venable LLP

(57) ABSTRACT

A linear feature in an arbitrary direction on an object surface is detected. An image processing apparatus according to the present disclosure generates an image of a target object by lighting using a virtual light source and detects the linear feature included in the target object based on the image.

18 Claims, 15 Drawing Sheets

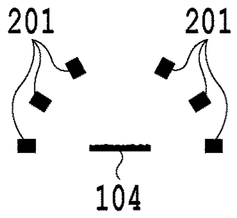
FIG.9A
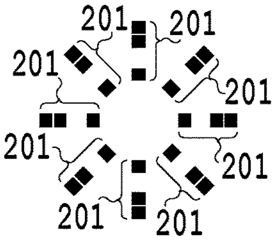
FIG.9B
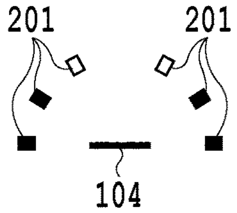
FIG.9C
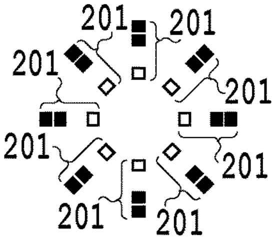
FIG.9D
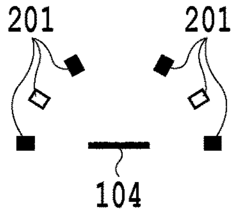
FIG.9E
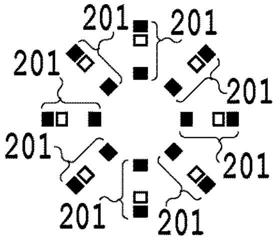
FIG.9F
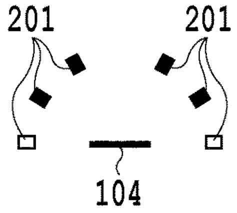
FIG.9G
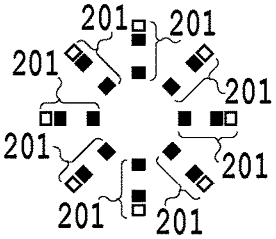
FIG.9H
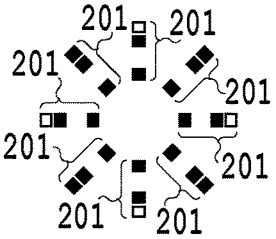
FIG.9I
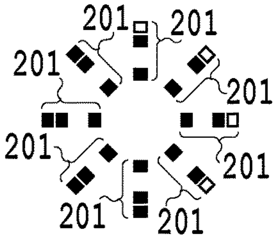
FIG.9J
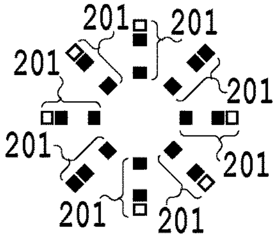
FIG.9K
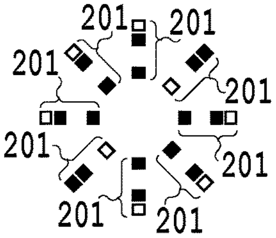
FIG.9L
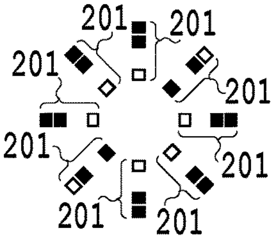
FIG.9M
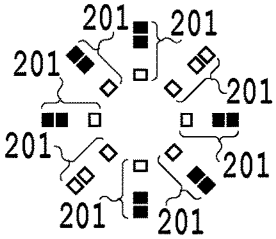
FIG.9N
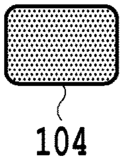
FIG.9O
| TYPE OF INSPECTION TARGET | SET OF VIRTUAL LIGHT SOURCE VECTORS |
|---|---|
| PRODUCT A | n |
| PRODUCT B | h |
| PRODUCT C | i |
FIG.9P
| TYPE OF INSPECTION TARGET | SET OF VIRTUAL LIGHT SOURCE VECTORS |
|---|---|
| CIRCULAR | h |
| RECTANGULAR | i |
FIG.9Q

Z

X

Y

VIRTUAL LIGHT
SOURCE VECTOR

NORMAL
MAP $n_x$
$n_y$
$n_z$

* $\left.\begin{array}{l}L'_x\\L'_y\\L'_z\end{array}\right.$

CORRELATION
MAP

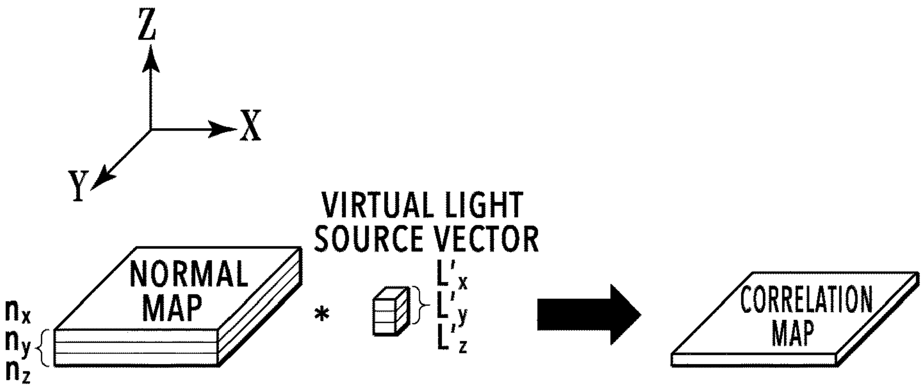

FIG.14A

CORRELATION
MAP

SPACE
FILTER

*

FILTER
IMAGE

FIG.14B

VIRTUAL LIGHT
SOURCE VECTOR

NORMAL
MAP $n_x$
$n_y$
$n_z$

* $\left.\begin{array}{l}L'_x\\L'_y\\L'_z\end{array}\right.$

SPACE
FILTER

*

FILTER
IMAGE

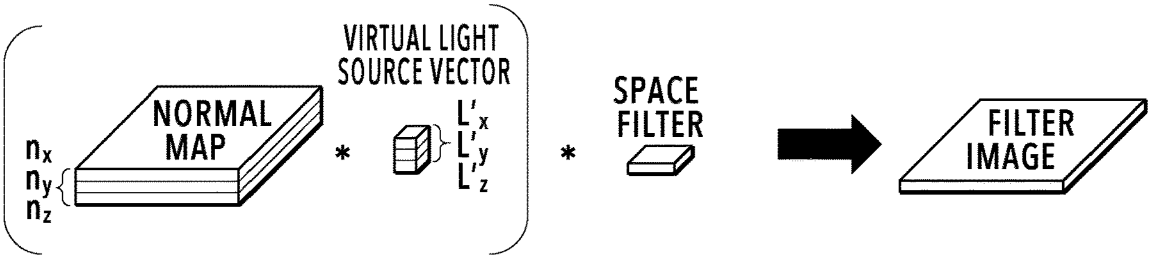

FIG.14C

VIRTUAL LIGHT
SOURCE VECTOR

SPACE
FILTER

NORMAL
MAP $n_x$
$n_y$
$n_z$

* $\left.\begin{array}{l}L'_x\\L'_y\\L'_z\end{array}\right.$ ⊗

FILTER
IMAGE

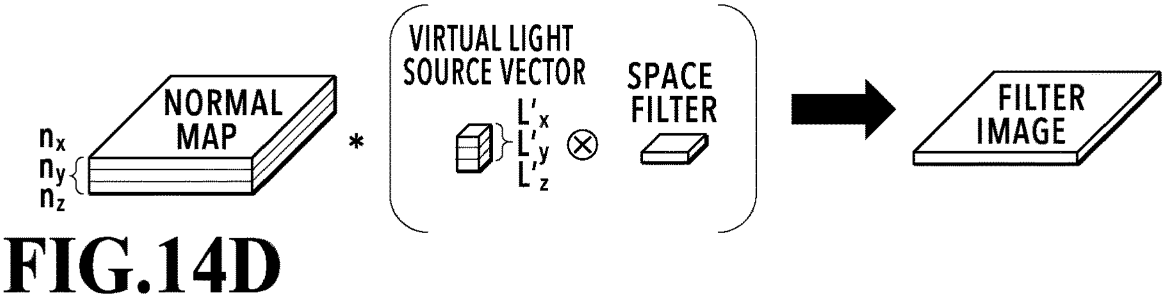

FIG.14D

MULTI-CHANNEL
SPACE FILTER

NORMAL
MAP $n_x$
$n_y$
$n_z$

*

FILTER
IMAGE

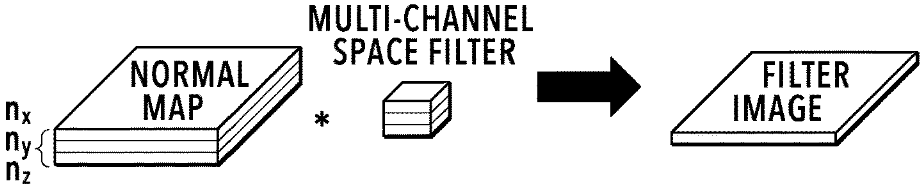

FIG.14E

IMAGE PROCESSING APPARATUS, IMAGE PROCESSING METHOD, AND STORAGE MEDIUM

BACKGROUND

Field

The present disclosure relates to a technique of detecting a feature on an object surface.

Description of the Related Art

There has been known a technique of detecting irregularities on an inspection surface as an appearance inspection technique of industrial products. Japanese Patent Laid-Open No. 2019-191105 discloses a technique in which multiple light sources forming a multi-light lighting are turned on one by one, an image of an inspection surface is captured at each lighting-up, and irregularities on the inspection surface are detected based on the multiple images obtained by the image capturing.

SUMMARY

According to the present disclosure, an image processing apparatus is provided comprising: one or more hardware processors; and one or more memories storing one or more programs configured to be executed by the one or more hardware processors, the one or more programs including instructions for: generating an image of a target object by lighting using a virtual light source; and detecting a linear feature included in the target object based on the image.

Further features of the present disclosure will become apparent from the following description of exemplary embodiments with reference to the attached drawings.

BRIEF DESCRIPTION OF THE DRAWINGS

FIGS. 9A to 9N are diagrams illustrating an example of arrangement of virtual light sources according to the Embodiment 2, FIG. 9O is a diagram illustrating an example of an inspection surface of an inspection object on which a periodic pattern of linear irregularities is formed, and FIGS. 9P and 9Q are diagrams illustrating an example of a set of the virtual light sources to be set;

FIGS. 14A to 14E are diagrams describing an example of processing of the image processing apparatus according to the Embodiment 4.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

In appearance inspection of industrial products, in some cases, there is a demand to detect a linear feature on an inspection surface such as fine irregularities extending linearly on the inspection surface including a scratch and the like (hereinafter, referred to as "linear irregularities"). According to the technique described in Japanese Patent Laid-Open No. 2019-191105, it is possible to emit light from various directions by a multi-light lighting. Therefore, in a case where the linear irregularities are irradiated with light orthogonal to a direction in which the linear irregularities extend, it is possible to detect the linear irregularities even in a case where the irregularities are fine. However, in the technique described in Japanese Patent Laid-Open No. 2019-191105, since the arrangement of the multiple light sources is discrete, in some cases, it is impossible to detect the linear irregularities that extend in the direction that is orthogonal to none of the light from the multiple light sources.

To deal with this, an object of the present disclosure is to provide processing of detecting a linear feature in an arbitrary direction on an object surface.

<Hardware Configuration of Image Processing Apparatus>

In image processing of the present disclosure, first, a normal map of an inspection surface of an object as an inspection target (hereinafter, referred to as a "target object"). In this case, the target object is an industrial product such as a home appliance, a beauty product, or the like, for example. Then, a linear feature on the inspection surface is detected based on the obtained normal map. In this case, the linear feature on the inspection surface is irregularities extending linearly on the inspection surface (hereinafter, referred to as "linear irregularities"), for example. The detected linear irregularities (linear feature) are unintended irregularities such as a scratch or irregularities formed purposely by embossing and the like, for example. The normal map of the inspection surface may be obtained by any publicly known method. In the following embodiment, as an example, it is described that the normal map is obtained by a photometric stereo method; however, a method of obtaining the normal map is not limited thereto. For example, the normal map may be obtained by obtaining shape information on the inspection surface by a light section method and generating the normal map based on the obtained shape information.

Figure 1A:
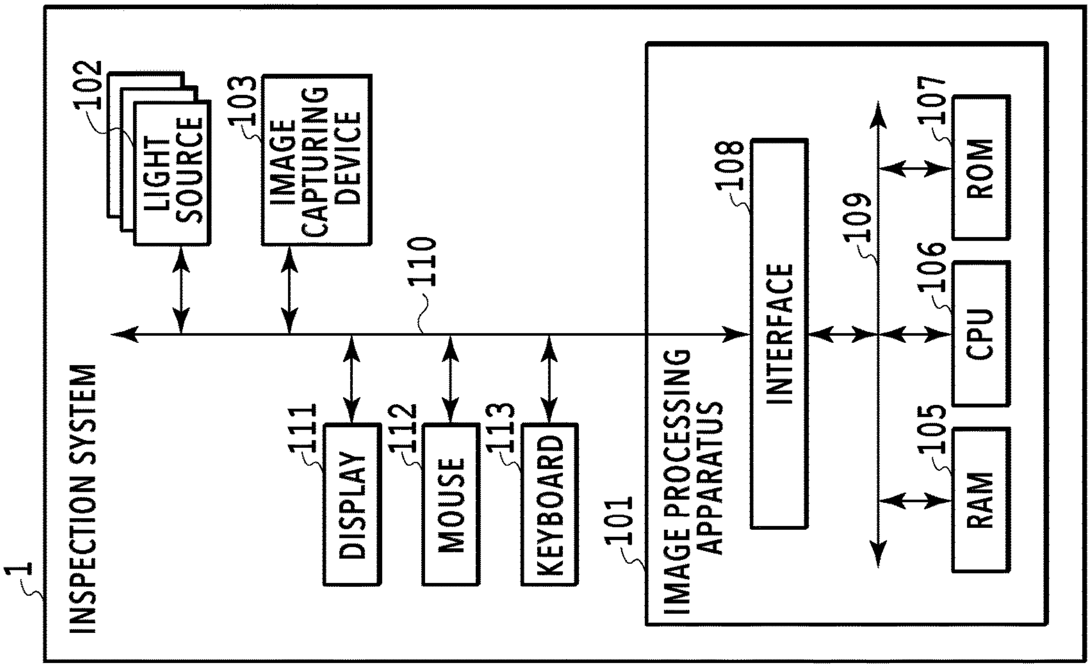
FIG. 1A is a block diagram illustrating an example of a configuration of an inspection system according to the present disclosure.

FIG. 1A is a block diagram illustrating an example of a configuration of an inspection system 1 according to the present disclosure. The inspection system 1 includes an image processing apparatus 101, multiple light sources 102, an image capturing device 103, a display 111, a mouse 112, and a keyboard 113. Additionally, FIG. 1A illustrates an example of a hardware configuration of the image processing apparatus 101 according to the present disclosure. The image processing apparatus 101 includes a RAM 105, a CPU 106, a ROM 107, and an interface 108. They are connected communicably to each other through an internal bus 109. Processing described in a flowchart described later is stored in the ROM 107 as a program code. The program code is deployed to the RAM 105 and executed by the CPU 106. The light sources 102, the image capturing device 103, the display 111, the mouse 112, and the keyboard 113 are each connected communicably with the image processing apparatus 101 through the interface 108 and an external bus 110. The display 111 presents information to a user, and the mouse 112 and the keyboard 113 receive an input from the user. Details of the light sources 102 and the image capturing device 103 are described later.

Figure 1B:
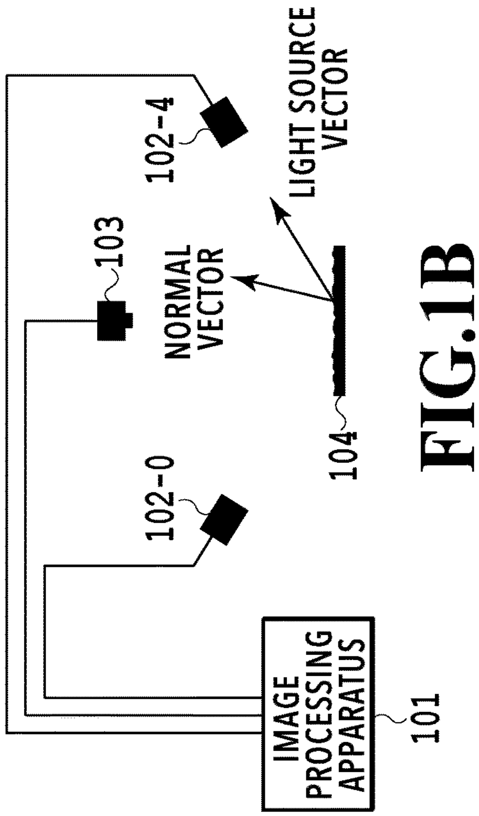
FIG. 1B is a diagram illustrating an example of appearance of the inspection system according to the present disclosure.
Figure 1C:
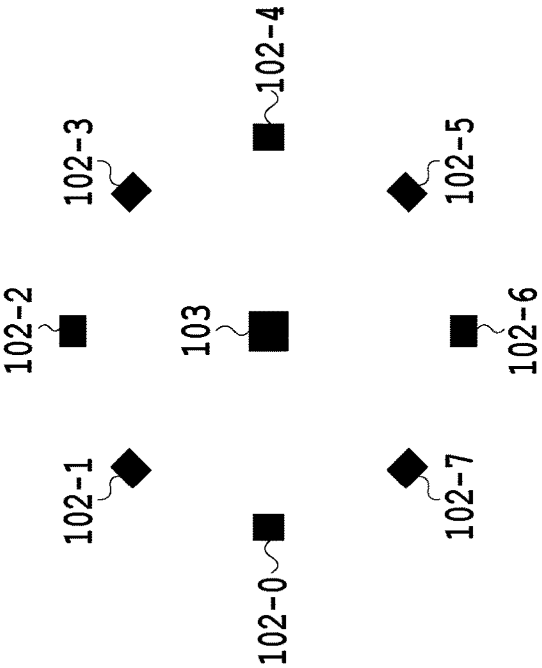
FIG. 1C is a diagram illustrating an example of arrangement of light sources and an image capturing device according to the present disclosure.

FIG. 1B is a diagram illustrating an example of appearance of the inspection system 1 according to the present disclosure and illustrates an example of the appearance in a case of viewing the inspection system 1 from the side. FIG. 1C is a diagram illustrating an example of arrangement of the light sources 102 and the image capturing device 103 according to the present disclosure and illustrates an example of arrangement of the light sources 102 and the image capturing device 103 in a case of viewing the inspection system 1 from above. A domical multi-light lighting is formed of the multiple light sources 102 (light sources 102-0 to 102-7), and control to turn on and turn off each light source is performed by the image processing apparatus 101. The image capturing device 103 is formed of a digital still camera or the like, and a timing of image capturing and the like of the image capturing device 103 are controlled by the image processing apparatus 101. Note that, hereinafter, it is described that the inspection system 1 includes eight light sources 102, which are the light sources 102-0 to 102-7; however, as long as three or more light sources 102 are applied, the number is not limited to eight.

The image processing apparatus 101 individually controls turning on and turning off of the light sources 102-0 to 102-7 and irradiates the inspection surface of a target object (hereinafter, referred to as an "inspection object") 104. The image processing apparatus 101 controls exposing, focusing, timings of image capturing, and the like of the image capturing device 103 and causes the image capturing device 103 to capture an image of the inspection surface. Specifically, the image processing apparatus 101 individually turns on the eight light sources 102 in the order of the light source 102-0, the light source 102-1, . . . the light source 102-7, and causes the image capturing device 103 to capture an image of the inspection surface every time the light source 102 is turned on. Thus, the image processing apparatus 101 obtains data of eight captured images obtained by the image capturing. For example, first, the image processing apparatus 101 obtains captured image data obtained by the image capturing while only the light source 102-0 is turned on. Next, the image processing apparatus 101 obtains captured image data obtained by the image capturing while only the light source 102-1 is turned on, as second captured image data. The image processing apparatus 101 generates the normal map by the photometric stereo method based on the obtained data of eight captured images and detects the irregularities on the inspection surface based on the generated normal map.

<Generation of Normal Map by Photometric Stereo Method>

A method of generating the normal map by the photometric stereo method is described. Here, a case where there are eight light sources 102 is described as an example. Note that, as long as the number of the light sources 102 is three or greater, it is not limited to eight. In the photometric stereo method, the Lambert's cosine law is assumed, and it is assumed that reflection luminance of the inspection surface is proportional to an inner product of a vector indicating the orientation of the light source and a normal vector. That is, in the photometric stereo method, it is assumed that the following Equation (1) is satisfied in each position (x, y) on the inspection surface. Note that, hereinafter, it is described that the inspection surface is on an xy plane including an x axis and a y axis, and a direction orthogonal to the xy plane is a z axis (hereinafter, referred to as a "perpendicular axis").

$$I_i = L_i N_\rho = [L_{ix} L_{iy} L_{iz}] \begin{bmatrix} \rho N_x \\ \rho N_y \\ \rho N_z \end{bmatrix}$$
<div align="right">Equation (1)</div>

In the Equation (1), $I_i$ (i is an arbitrary integer from 0 to 7) is the reflection luminance in the position (x, y) in a case where only a light source 102-$i$ is turned on. The reflection luminance $I_i$ can be calculated by using the captured image data. $L_i=(L_{ix}, L_{iy}, L_{iz})$ is a unit vector (hereinafter, referred to as a "light source vector") in the position (x, y) that indicates a direction of the light source 102-$i$ from the position (x, y). FIG. 1B exemplifies the light source vector indicating the direction of the light source 102-4 from the position on the inspection surface. $N_\rho=(\rho N_x, \rho N_y, \rho N_z)^T$ is a pseudo normal vector obtained by multiplying the normal vector $N=(N_x, N_y, N_z)^T$ in the position (x, y) by an albedo (reflectance) p in the position (x, y). Note that, T indicates transposition of the vectors, and the normal vector N is expressed by the unit vector. FIG. 1B exemplifies the normal vector in a certain position on the inspection surface. Since the Equation (1) is satisfied with any light source 102, the following Equation (2) is obtained as a summary.

$$\begin{bmatrix} I_0 \\ I_1 \\ \vdots \\ I_7 \end{bmatrix} = \begin{bmatrix} L_{0x} & L_{0y} & L_{0z} \\ L_{1x} & L_{1y} & L_{1z} \\ \vdots & \vdots & \vdots \\ L_{7x} & L_{7y} & L_{7z} \end{bmatrix} \begin{bmatrix} \rho N_x \\ \rho N_y \\ \rho N_z \end{bmatrix}$$
<div align="right">Equation (2)</div>

Additionally, the following Equation (3) is obtained where the vectors on the left-hand side in the Equation (2) is written as I, and the matrix of eight rows and three columns on the right-hand side is written as L. Hereinafter, I is referred to as a luminance vector, and L is referred to as a light source matrix.

$$I = LN_\rho \quad \text{Equation (3)}$$

In this case, the luminance vector I can be calculated from the data of the eight captured images, and additionally, the light source matrix L can be calculated from a result of measurement performed in advance. Therefore, it is possible to say that the Equation (3) is a simultaneous equation in which three components of the pseudo normal vector $N_\rho$ are unknowns. For instance, in a case where the number of the light sources 102 are three, the light source matrix L is a square matrix of three rows and three columns. In a case where Lis a non-singular matrix, an inverse matrix $L^{-1}$ of L can be obtained. With this $L^{-1}$ being applied to the luminance vector I, it is possible to obtain a solution of the pseudo normal vector $N_\rho$ that is the unknown of the Equation (3).

On the other hand, in a case where the number of the light sources 102 is four or greater, the Equation (3) is a simultaneous equation of an overdetermined system. In this case, as indicated by the following Equation (4), with a pseudo inverse matrix $(L^T L)^{-1} L^T$ of the light source matrix L being applied to the luminance vector I, it is possible to obtain a least-squares solution of the Equation (3).

$$N_\rho = (L^T L)^{-1} L^T I \quad \text{Equation (4)}$$

In this case, the albedo p is comparable to a length of the pseudo normal vector $N_\rho$ and thus can be obtained by the following Equation (5).

$$\rho = |N_\rho| \quad \text{Equation (5)}$$

Additionally, the normal vector N is the unit vector obtained by normalizing the length of the pseudo normal vector $N_\rho$ to 1. Therefore, the normal vector N can be obtained by the following Equation (6).

$$N = (1/\rho) N_\rho \quad \text{Equation (6)}$$

With the calculation of the Equations (4) to (6) for each position (x, y), it is possible to obtain the normal map indicating spatial distribution of the normal vector on the inspection surface. In this case, an albedo map (reflectance map) indicating spatial distribution of the albedo on the inspection surface can also be obtained by the Equation (5).

<Confirmation of Problem in Present Disclosure>

Figure 2A:
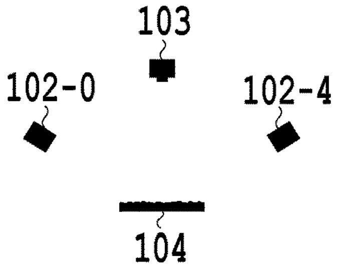
FIGS. 2A to 2H are diagrams illustrating an example of arrangement of the light sources and the image capturing device in the inspection system.
Figure 2B:
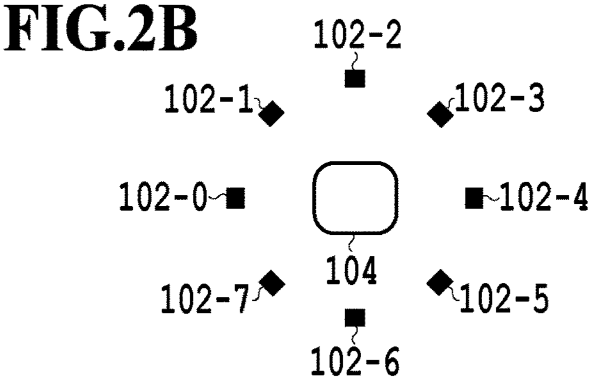

FIGS. 2A to 2H are diagrams illustrating an example of arrangement of the light sources 102 and the image capturing device 103 in the inspection system 1 including the domical multi-light lighting. Specifically, FIG. 2A illustrates an example of arrangement of the light sources 102 and the image capturing device 103 in a case of viewing the inspection system 1 from the side, and FIGS. 2B to 2H illustrate an example of arrangement of the light sources 102 in a case of viewing the inspection system 1 from above. Note that, in FIGS. 2B to 2H, since the image capturing device 103 is overlapped with the inspection object 104, illustration of the image capturing device 103 is omitted. It is described that the inspection system 1 includes the eight light sources 102, which are the light sources 102-0 to 102-7. In the technique described in Japanese Patent Laid-Open No. 2019-191105, first, the light sources 102-0 to 102-7 are turned on one by one, and an image of the inspection surface of the inspection object 104 is captured at each lighting-up. Subsequently, based on the multiple captured image data obtained by the image capturing, whether there are irregularities on the inspection surface is inspected. Note that, in the technique described in Japanese Patent Laid-Open No. 2019-191105, the captured image data is directly used for the inspection; for this reason, the above-described normal map is not generated.

Incidentally, in the appearance inspection of industrial products, in some cases, there is a demand to detect fine linear irregularities such as a scratch. According to the technique described in Japanese Patent Laid-Open No. 2019-191105, it is possible to emit light from various directions by the multi-light lighting. Therefore, as illustrated in FIGS. 2C to 2F, even in a case where the irregularities are fine, it is possible to detect the linear irregularities by irradiating with light orthogonal to a direction in which the linear irregularities extend. Note that, in FIGS. 2C to 2F, the light source 102 illustrated as a white rectangle indicates the light source 102 that is turned on, and the light source 102 illustrated as a black rectangle indicates the light source 102 that is turned off. Additionally, in FIGS. 2C to 2F, multiple arrows extending from the light source 102 that is turned on toward the inspection object 104 indicate a direction of the light emitted from the light source 102.

Figure 2C:
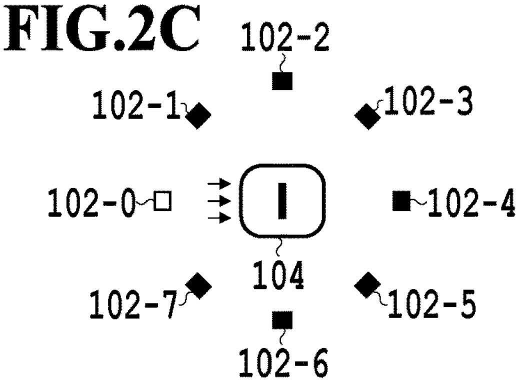
Figure 2D:
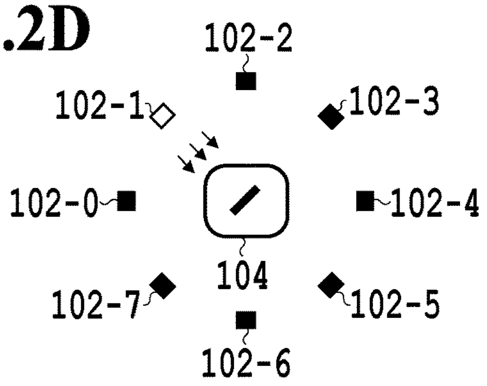
Figure 3A:
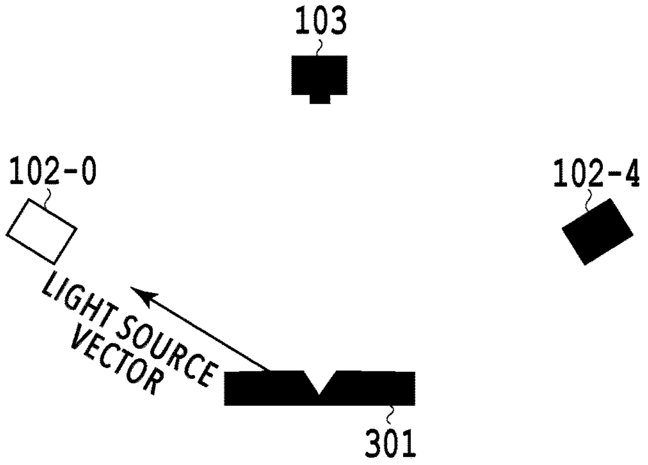
FIGS. 3A to 3E are diagrams describing an example of a principle of detection of linear irregularities.
Figure 3B:
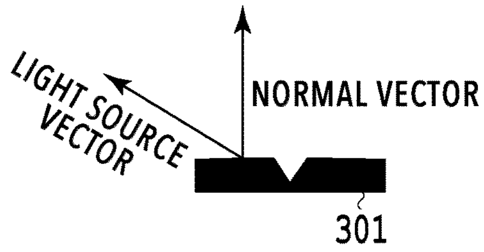
Figure 3C:
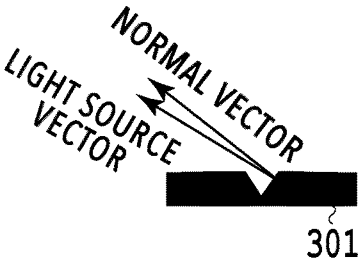
Figure 3D:
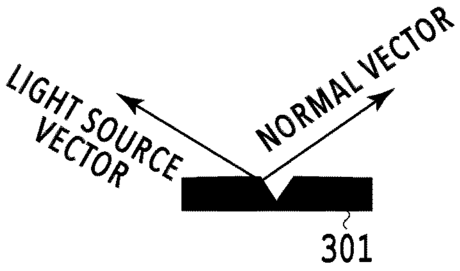

The principle of the detection of the linear irregularities is described with reference to FIGS. 3A to 3E. FIGS. 3A to 3E are diagrams describing an example of the principle of the detection of the linear irregularities. Specifically, FIG. 3A illustrates arrangement of the light sources 102 and the image capturing device 103 in a case of viewing the inspection system 1 from the side in a state illustrated in FIG. 2C in which the light source 102-0 is turned on. Additionally, each of FIGS. 3B to 3D is a diagram illustrating the normal vector in each position on the inspection surface. A cross-section 301 indicates a cross-section of the inspection object 104 including the linear irregularities. Moreover, FIGS. 3A to 3D illustrate the light source vector corresponding to the light source 102-0.

As illustrated in FIG. 3B, in a flat region on the inspection surface, an angle formed by the light source vector and the normal vector is intermediate. According to the Lambert's cosine law, as the angle formed by the light source vector and the normal vector is smaller, the reflection luminance is greater; therefore, the reflection luminance of the flat region on the inspection surface is intermediate. On the other hand, as illustrated in FIG. 3C, in inclined surfaces formed by the linear irregularities, on an inclined surface on the opposite side of the light source that is turned on (the light source 102-0), the angle formed by the light source vector and the normal vector is small, and thus the reflection luminance is great. On the other hand, as illustrated in FIG. 3D, on an inclined surface on the same side as that of the light source that is turned on (the light source 102-0), the angle formed by the light source vector and the normal vector is great, and thus the reflection luminance is small.

Figure 2E:
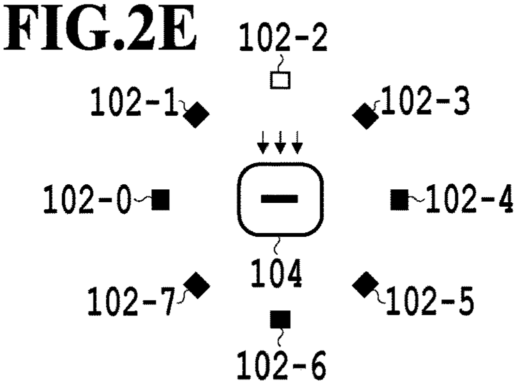
Figure 2F:
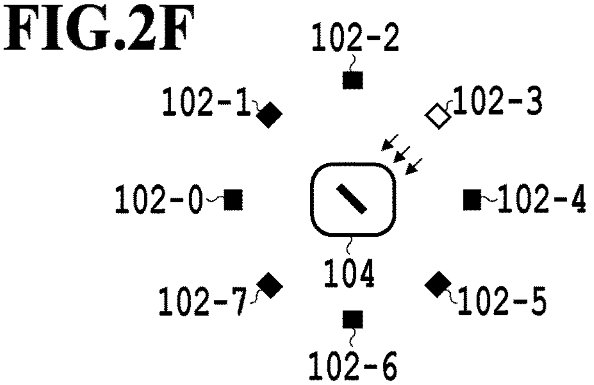
Figure 3E:
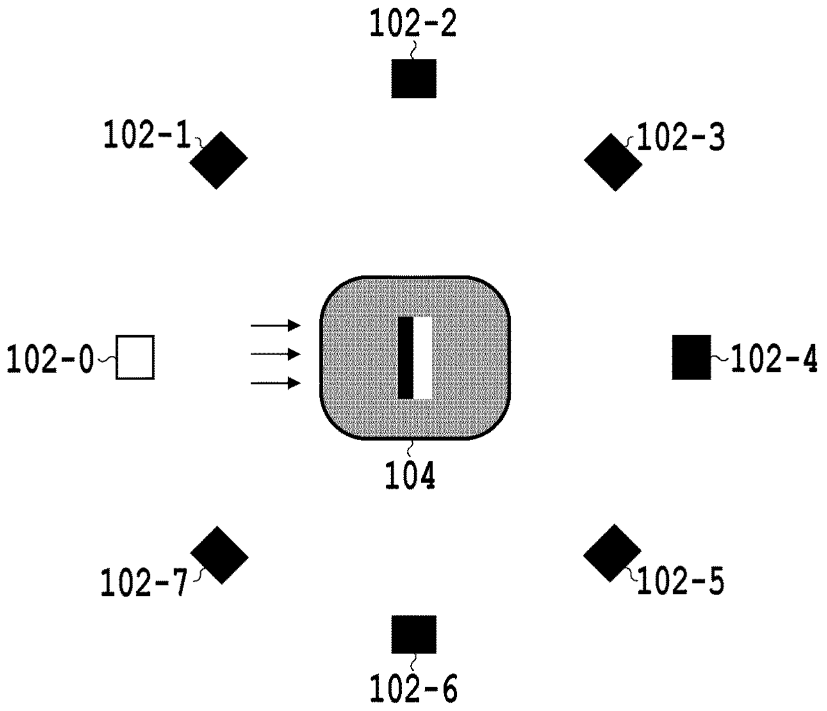

FIG. 3E is a diagram illustrating an example of luminance distribution of the inspection surface that is obtained in a state illustrated in FIG. 3A. Note that, for the sake of description, FIG. 3E illustrates the luminance distribution so as to be overlapped with the inspection surface of the inspection object 104. In the luminance distribution illustrated in FIG. 3E, a region with great reflection luminance is illustrated in white, a region with intermediate reflection luminance is illustrated in gray, and a region with small reflection luminance is illustrated in black. Thus, with the image capturing by irradiating the inspection surface including the linear irregularities with light, shade caused by the irregularities occurs on the captured image. The intensity of the shade (contrast) becomes the highest in a case where the linear irregularities such as a scratch are irradiated with light orthogonal to the direction in which the linear irregularities extend. Therefore, as illustrated in FIGS. 2C to 2F, even in a case where the irregularities are fine, it is possible to detect the linear irregularities by irradiating the linear irregularities with light orthogonal to the direction in which the linear irregularities extend.

Figure 2G:
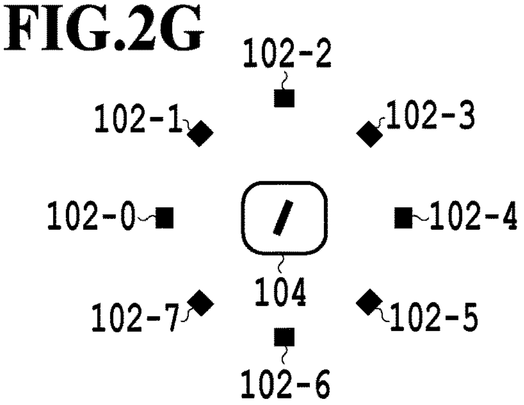

However, as illustrated in FIG. 2G, in a case where there is no light source 102 that emits light in a direction orthogonal to the direction in which the linear irregularities extend, it is impossible to irradiate the linear irregularities with light orthogonal to the direction in which the linear irregularities extend in a case of the image capturing of the inspection surface. In this case, the shade caused by the irregularities is weaker than that in a case of the irradiation with the orthogonal light, and in some cases, it is impossible to detect the fine linear irregularities. For instance, if the light sources 102 can be arrayed at fine intervals such as 1°, and the light can be emitted, the problem is almost solved. However, since 180 or 360 pieces of many light sources 102 are necessary in this case, such a method is unrealistic. That is, since the arrangement of the light sources is discrete in the technique described in Japanese Patent Laid-Open No. 2019-191105, if the linear irregularities are fine, in some cases, it is impossible to detect the linear irregularities extending in an arbitrary direction.

Figure 4A:
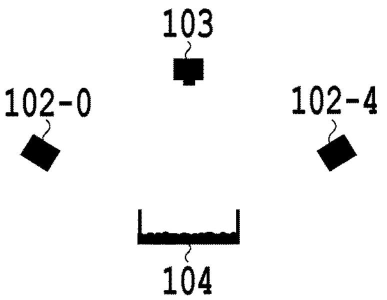
FIGS. 4A to 4F are diagrams illustrating an example of arrangement of the light sources and the image capturing device in the inspection system.
Figure 4B:
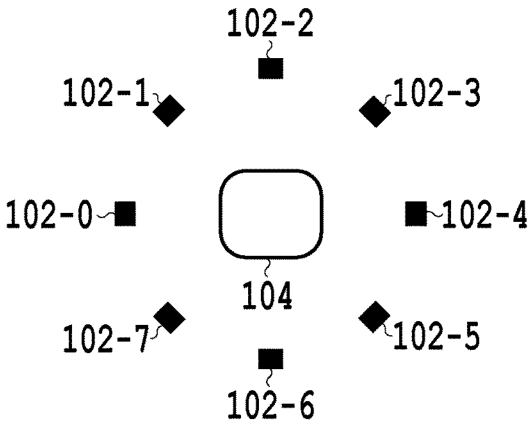
Figure 4C:
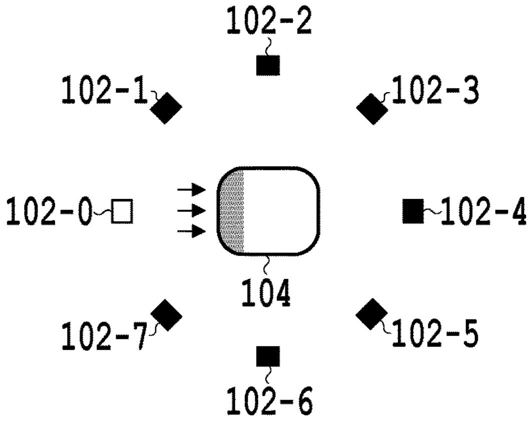
Figure 4D:
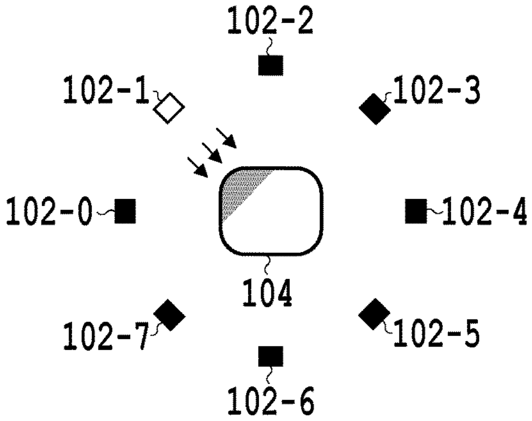
Figure 4E:
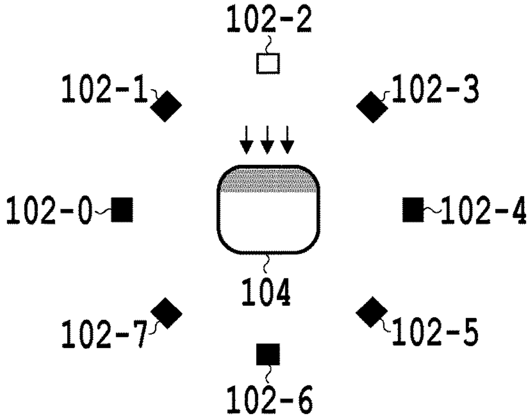
Figure 4F:
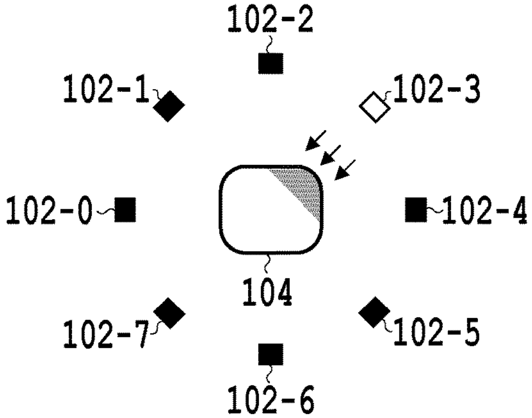

Additionally, in a case where the inspection object has a three-dimensional shape, a shadow occurs on the inspection surface. FIGS. 4A to 4F are diagrams illustrating an example of arrangement of the light sources 102 and the image capturing device 103 in the inspection system 1 including the domical multi-light lighting. Specifically, FIG. 4A illustrates arrangement of the light sources 102 and the image capturing device 103 in a case of viewing the inspection system 1 from the side, and FIGS. 4B to 4F illustrate arrangement of the light sources 102 in a case of viewing the inspection system 1 from above. Note that, in FIGS. 4B to 4F, since the image capturing device 103 is overlapped with the inspection object 104, illustration of the image capturing device 103 is omitted. Additionally, in FIGS. 4C to 4F, the light source 102 illustrated as a white rectangle indicates the light source 102 that is turned on, and the light source 102 illustrated as a black rectangle indicates the light source 102 that is turned off. Moreover, in FIGS. 4C to 4F, multiple arrows extending from the light source 102 that is turned on toward the inspection object 104 indicate a direction of the light emitted from the light source 102.

As illustrated in FIG. 4A, in a case where an outer frame of the inspection object 104 is higher than the inspection surface, a shadow (expressed in gray in FIG. 4) occurs on the inspection surface as illustrated in FIGS. 4C to 4F. In the technique described in Japanese Patent Laid-Open No. 2019-191105, the multiple captured image data obtained by the image capturing under the lighting-up of the light sources 102 forming the multi-light lighting are directly used for the inspection; for this reason, in a region in which the shadow occurs on the inspection surface, it is impossible to detect the linear irregularities normally. That is, in the technique described in Japanese Patent Laid-Open No. 2019-191105, in a case where the inspection object has a three-dimensional shape, in some cases, there is a region that cannot be inspected.

Overview and Effect of Present Disclosure

In the present disclosure, the multiple captured image data obtained by the image capturing under the lighting-up of the light sources 102 forming the multi-light lighting are not directly used for the inspection, and based on the captured image data, the normal map of the inspection surface is obtained by the photometric stereo method or the like. Additionally, re-lighting using a predetermined virtual light source (hereinafter, referred to as "lighting") is performed to simulate the luminance distribution of the inspection surface based on the normal map, and the linear irregularities are detected based on the luminance distribution.

Figure 2H:
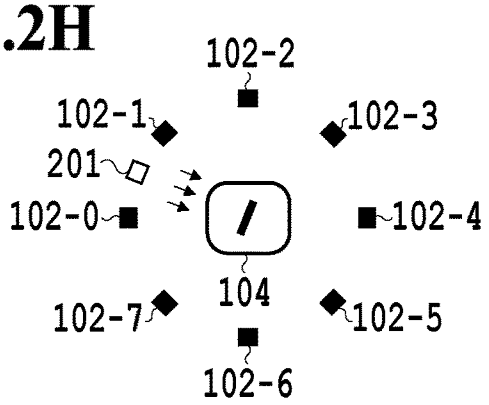

Specifically, for example, first, in a case of detecting the linear irregularities illustrated in FIG. 2G, as illustrated in FIG. 2H, the image processing apparatus 101 sets a virtual light source 201 in a direction orthogonal to the direction in which the linear irregularities extend. Subsequently, the image processing apparatus 101 simulates the luminance distribution of the inspection surface in a case where the light is emitted from the position of the virtual light source 201 by using the normal map. Specifically, as with the light source vector $L_i$ in the Equation (1), the unit vector indicating a direction of the virtual light source 201 from the inspection surface (hereinafter, referred to as a "lighting direction") is set as a virtual light source vector $L'_v$. Then, the Lambert's cosine law is assumed, an inner product of the virtual light source vector $L'_v$ and each normal vector in the normal map is obtained for each position (x, y), the luminance distribution of the inspection surface is simulated, and thus data of a lighting image is obtained. In this process, the albedo (reflectance) in each position (x, y) on the inspection surface may be taken into consideration. Based on the data of the lighting image obtained as described above, the image processing apparatus 101 detects the linear feature (linear irregularities) on the inspection surface.

That is, the image processing apparatus 101 sets the virtual light source 201 such that the lighting direction is orthogonal to the direction in which the linear irregularities as the detection target extend, and the linear irregularities are detected based on the data of the lighting image obtained by the lighting by the virtual light source 201. For instance, in a case where the direction in which the linear irregularities as the detection target extend is a vertical direction as illustrated in FIG. 2C, the image processing apparatus 101 sets the virtual light source 201 in the position of the light source 102-0 or 102-4. Additionally, in a case where the direction in which the linear irregularities as the detection target extend is a horizontal direction as illustrated in FIG. 2E, the image processing apparatus 101 sets the virtual light source 201 in the position of the light source 102-2 or 102-6. Thus, the image processing apparatus 101 sets the virtual light source 201 in the position corresponding to the direction in which the linear irregularities as the detection target extend. In this case, the direction in which the linear irregularities as the detection target extend is different depending on the type, the shape, or the like of the inspection object 104 as the inspection target. Therefore, the position in which the virtual light source 201 is set may be determined depending on the type, the shape, or the like of the inspection object 104 as the inspection target. The type or the shape of the inspection object 104 may be set by the user in a case of the inspection of the inspection object 104 or may be specified automatically by a publicly known image categorization technique.

In the domical multi-light lighting as illustrated in FIGS. 2A to 2H, although arrangement of actual light sources is discrete, it is possible to set the virtual light sources in arbitrary positions. For example, as illustrated in FIG. 2G, even in a case where there is no light source 102 in a direction orthogonal to the direction in which the linear irregularities extend, if it is the virtual light source 201, as illustrated in FIG. 2H, it is possible to set the virtual light source 201 in a direction orthogonal to the direction in which the linear irregularities extend. With this, it is possible to simulate the luminance distribution of the inspection surface in a case where the linear irregularities are irradiated with light from a direction orthogonal to the direction in which the linear irregularities extend. Therefore, it is possible to detect the linear irregularities accurately even if the linear irregularities are fine.

According to the photometric stereo method, it is possible to generate the normal map with at least three actual light sources 102. In a case where the luminance distribution is simulated by using the normal map like the present disclosure, it is possible to easily increase the number of the virtual light sources. Therefore, for example, it is possible to set 180 or 360 pieces of many virtual light sources and to generate the lighting image at fine intervals such as 1°. That is, even in a case the number of the actual light sources 102 is small such as three or four, it is possible to perform the detection of the linear irregularities that is equivalent to a case of actually using 180 or 360 pieces of many light sources. As described above, according to the present disclosure, it is possible to detect the linear irregularities extending in an arbitrary direction.

Additionally, according to the photometric stereo method, as illustrated in FIGS. 4C to 4F, even in a case where the shadow occurs on the inspection surface, for example, it is possible to generate an accurate normal map by using the method disclosed in Japanese Patent Laid-Open No. 2012-122870. Specifically, in a case where the normal vector in each position (x, y) on the inspection surface is obtained by the Equation (4), the captured image data in which no shadow occurs in the position (x, y) out of captured image data i corresponding to the eight light sources 102-*i* is selected for each position (x, y) and used. Therefore, it is possible to generate an accurate normal map even in a case where the shadow partially occurs in each captured image data. Accordingly, with use of the normal map generated as described above, according to the present disclosure, it is possible to detect the linear irregularities in all the regions on the inspection surface even in a case where the inspection object 104 has a three-dimensional shape.

As with a case where the shadow occurs on the inspection surface, even in a case where specular reflection occurs on the inspection surface, in the technique disclosed in Japanese Patent Laid-Open No. 2019-191105, in some cases, there is a region on the inspection surface in which no linear irregularities can be detected. On the other hand, according to the above-described method disclosed in Japanese Patent Laid-Open No. 2012-122870, it is possible to generate an accurate normal map even in a case where the specular reflection occurs on the inspection surface. Accordingly, with use of the normal map generated as described above, according to the present disclosure, it is possible to detect the linear irregularities in all the regions on the inspection surface even in a case where the specular reflection occurs on the inspection surface.

Additionally, Japanese Patent Laid-Open No. 2015-232476 discloses a technique of detecting the irregularities on the inspection surface based on a height map obtained from the normal map. Moreover, Japanese Patent Laid-Open No. 2003-240539 discloses a technique of obtaining an angle formed by a normal of the inspection object and a normal of a non-defective product for each position on the inspection surface, and detecting unintended irregularities on the inspection surface based on a value obtained by adding the angles corresponding to all pixels.

As with the present disclosure, these two techniques detect the irregularities based on the normal map; however, these two techniques do not detect the irregularities taking into consideration the magnitude of the irregularities visually sensed by a natural person. Specifically, these two techniques do not take into consideration the magnitude of the shade caused by the irregularities that is observed in the irradiation with light during the detection of the irregularities. Therefore, the irregularities that are not visually sensed may be determined as "there are irregularities", or conversely, the irregularities that are visually sensed may be determined as "there are no irregularities". On the other hand, the method of the present disclosure is to detect the linear irregularities based on the data of the image (lighting image) obtained by simulating the luminance distribution comparable to the appearance of the inspection surface in a case where the lighting by the virtual light source is performed. Therefore, according to the present disclosure, it is possible to detect the linear irregularities taking into consideration the magnitude of the irregularities that the natural person visually senses.

Note that, a method of simulating the luminance distribution of the inspection surface is not limited to the above-described method. For example, the luminance distribution of the inspection surface may be simulated assuming another publicly known physics model other than the Lambert's cosine law taking into consideration not only the diffuse reflection but also the specular reflection, for example. In this case, information such as the normal map, the albedo map, or the shape information of the inspection object used in physics simulations may be obtained by any publicly known method and not limited to be obtained by the above-described photometric stereo method. Additionally, instead of the above-described light source vector or virtual light source vector, the image processing apparatus 101 may use the positional information on the light source 102 or the virtual light source 201. Moreover, the image processing apparatus 101 may simulate the luminance distribution corresponding to the information indicating a virtual viewpoint or the position of the image capturing device 103. Furthermore, the linear feature as the detection target is not limited to the linear irregularities. For example, the appearance of the specular reflection caused by glossiness is changed depending on the lighting direction. Therefore, unevenness of the linear glossiness may be detected by using the configuration of the present disclosure. Specifically, in this case, for example, the virtual viewpoint is set in a direction of specular reflection light in a case where the lighting by the virtual light source is performed. Additionally, in a case where the inspection target has argument reflection properties, according to the present disclosure, it is also possible to detect unevenness of the linear argument reflectance. Moreover, the orientation of a line of the linear feature may be changed depending on a place. For example, according to the configuration of the present disclosure, it is also possible to perform the detection in a case where the linear irregularities are in a circular shape like the linear irregularities formed along a circular frame. Hereinafter, embodiments of the present disclosure are described specifically.

Embodiment 1

Figure 5A:
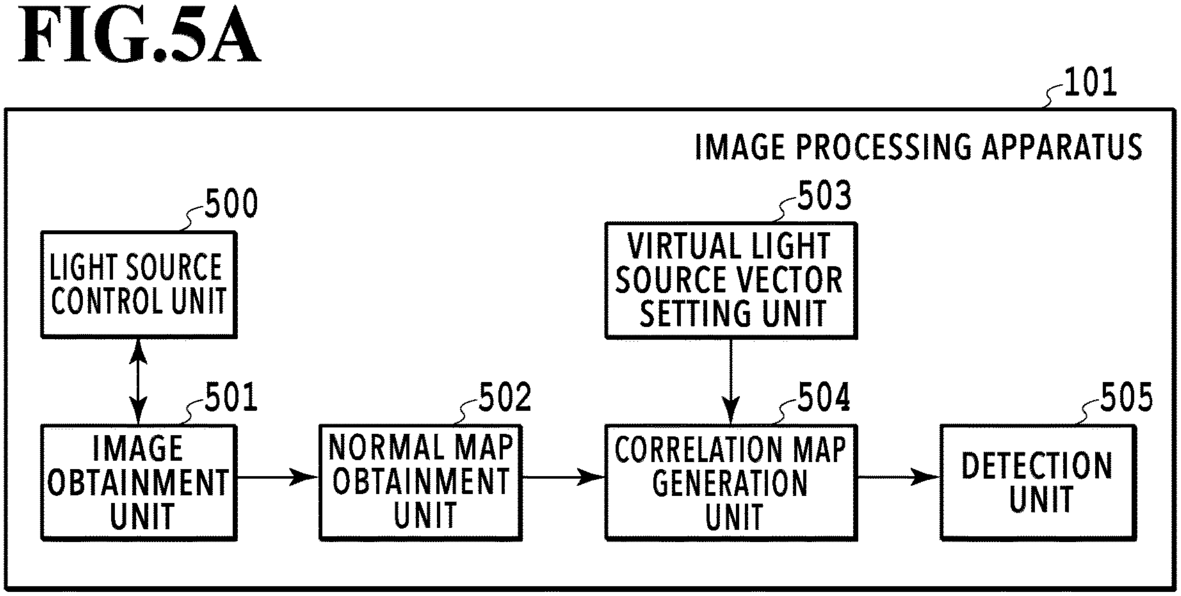
FIG. 5A is a block diagram illustrating an example of a functional configuration of an image processing apparatus according to an Embodiment 1.

The image processing apparatus 101 according to an Embodiment 1 is described with reference to FIGS. 5A to 5D and FIGS. 6A to 6C. FIG. 5A is a block diagram illustrating an example of a functional configuration of the image processing apparatus 101 according to the Embodiment 1. As a functional configuration, the image processing apparatus 101 includes a light source control unit 500, an image obtainment unit 501, a normal map obtainment unit 502, a virtual light source vector setting unit 503, a correlation map generation unit 504, and a detection unit 505. Processing in each functional configuration is implemented with the program code deployed in the RAM 105 being executed by the CPU 106.

Figure 6C:
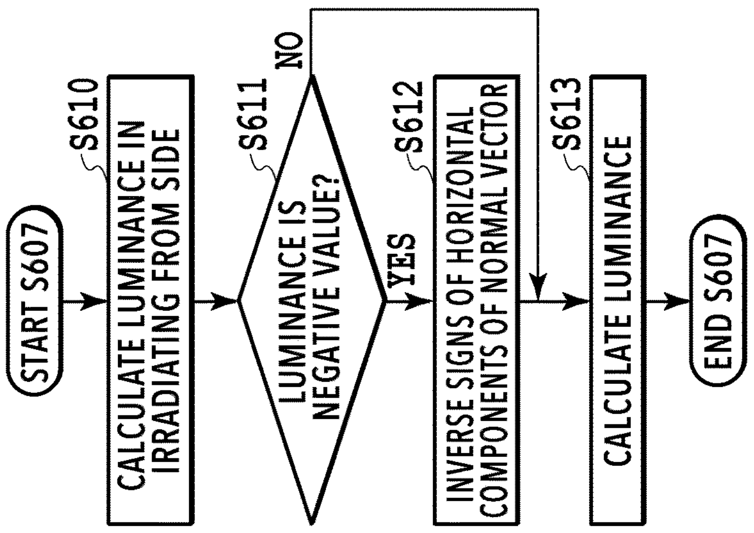
FIGS. 6B and 6C are flowcharts illustrating an example of a processing flow of a correlation map generation unit according to the Embodiment 1.
Figure 6B:
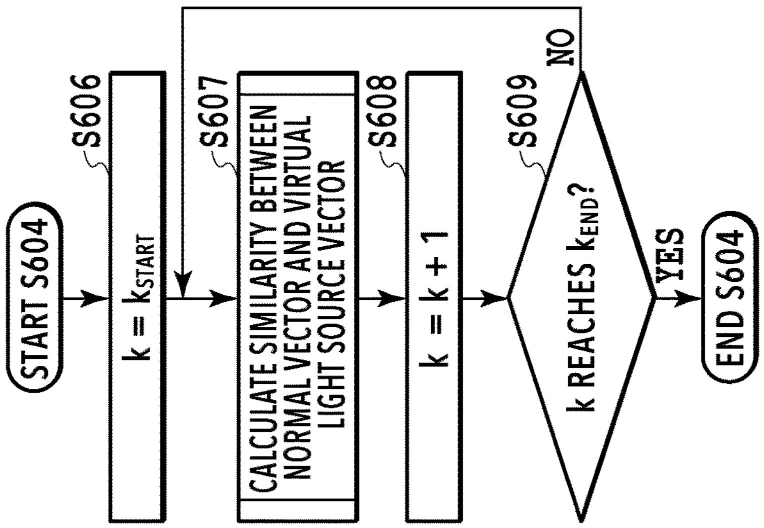
Figure 6A:
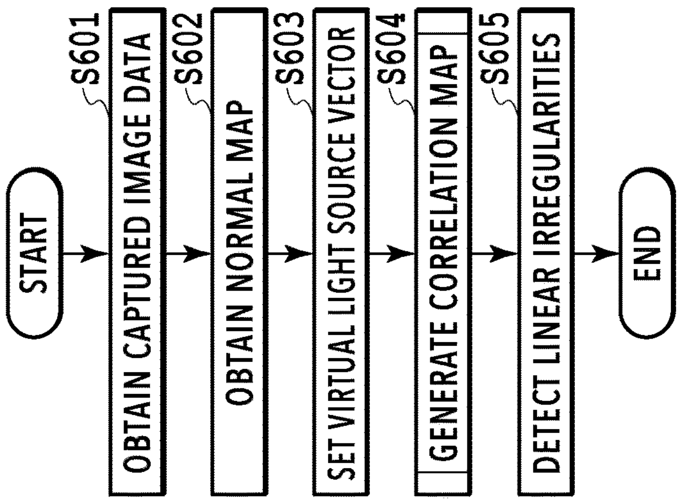
FIG. 6A is a flowchart illustrating an example of a processing flow of the image processing apparatus according to the Embodiment 1.

FIG. 6A is a flowchart illustrating an example of a processing flow of the image processing apparatus 101 according to the Embodiment 1. First, in S601, the image obtainment unit 501 controls the image capturing device 103 to cause the image capturing device 103 to capture an image of the inspection surface and obtains the captured image data obtained by the image capturing. Specifically, the image obtainment unit 501 operates in conjunction with the light source control unit 500 and causes the image capturing device 103 to perform the image capturing multiple times while the light source control unit 500 turns on the light sources 102 in a predetermined order; thus, the multiple captured image data are obtained.

Next, in S602, the normal map obtainment unit 502 generates and obtains the normal map by the Equation (4) by using the multiple captured image data obtained in S601. Next, in S603, the virtual light source vector setting unit 503 sets the virtual light source vector indicating the light emission direction of the virtual light source. Specifically, for example, the virtual light source vector setting unit 503 sets the virtual light source 201 between the light source 102-0 and the light source 102-1 as illustrated in FIG. 2H and sets the virtual light source vector corresponding to the position of the virtual light source 201.

Next, in S604, based on the normal map obtained in S602 and the virtual light source vector set in S603, the correlation map generation unit 504 generates the lighting image by simulating the luminance distribution of the inspection surface in the inspection object 104. Note that, as described later, the lighting image is generated based on the similarity between the normal vector and the virtual light source vector in each position on the inspection surface in the normal map. That is, the luminance in the lighting image is not limited to physical luminance and may also indicate conceptual luminance. Therefore, hereinafter, the lighting image is referred to as a correlation map. Next, in S605, based on the correlation map generated in S604, the detection unit 505 detects the linear irregularities on the inspection surface. The detection unit 505 outputs information indicating a result of the detection (hereinafter, referred to as "detection result information") to a not-illustrated external device through the interface 108 and the external bus 110, for example. After S605, the image processing apparatus 101 ends the processing in the flowchart illustrated in FIG. 6A.

Figure 5B:
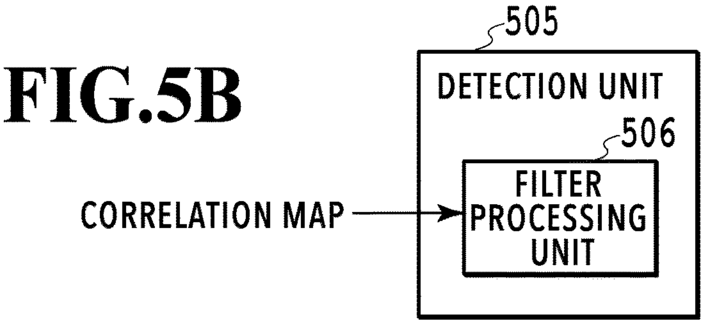
FIGS. 5B to 5D are diagrams illustrating an example of an internal configuration of a detection unit according to the Embodiment 1.
Figure 5C:
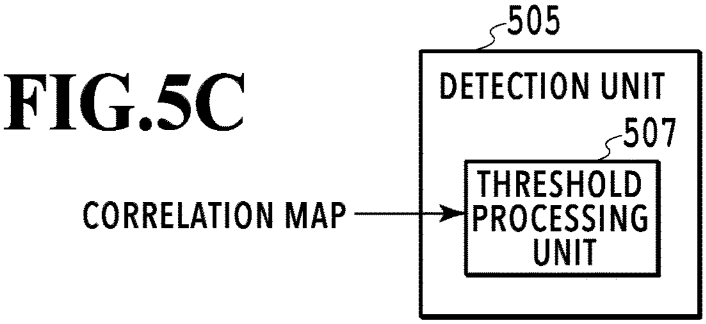
Figure 5D:
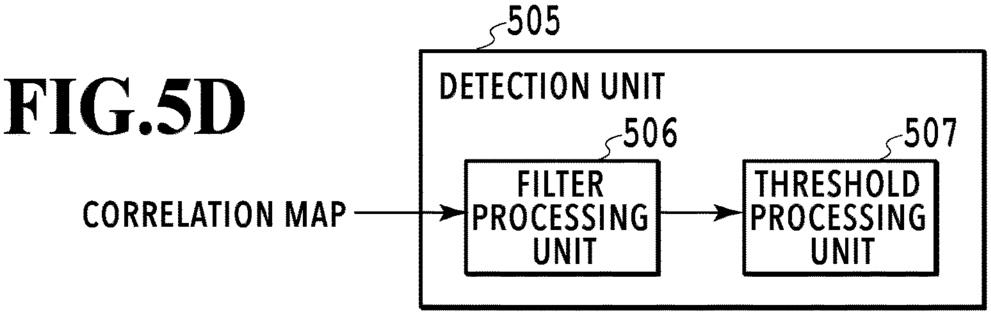

FIGS. 5B to 5D are diagrams illustrating an example of an internal configuration of the detection unit 505 according to the Embodiment 1. For example, as illustrated in FIG. 5C, the detection unit 505 includes a threshold processing unit 507. In a case where the detection unit 505 has a configuration as illustrated in FIG. 5C, the threshold processing unit 507 applies threshold processing to the correlation map and, for example, in a case where there is a pixel greater than a predetermined threshold in the correlation map, the detection unit 505 determines that there are the linear irregularities on the inspection surface. Additionally, for example, as illustrated in FIG. 5D, the detection unit 505 may include a filter processing unit 506 and the threshold processing unit 507. In a case where the detection unit 505 has a configuration as illustrated in FIG. 5D, before the threshold processing by the threshold processing unit 507, the filter processing unit 506 applies filter processing to the correlation map. In this process, with the filter processing, a filter coefficient that distributes a weight in a direction of the linear irregularities as the detection target, that is, a filter coefficient that distributes the weight in a direction orthogonal to the lighting direction of the virtual light source is used, determination accuracy in the threshold processing is improved. Additionally, as illustrated in FIG. 5B, the detection unit 505 may have a configuration in which the threshold processing is not performed, and only the filter processing is performed. Note that, the above-described threshold may be, for example, inputted by a user operation or may be held by the threshold processing unit 507.

Note that, a method of detecting the linear irregularities is not limited to those methods. For example, the detection unit 505 may perform determination on whether there are the linear irregularities on the inspection surface, categorization of orientation of the linear irregularities, categorization of a concave surface and a convex surface of the detected linear irregularities, or the like by inputting the correlation map to a learned model obtained by machine learning and the like. Additionally, for example, the detection unit 505 may obtain a difference from reference data as a criterion as a difference image and may detect the linear irregularities based on the obtained difference image. In this case, the reference data is, for example, the correlation map generated in advance by using the inspection object 104 in which it is confirmed that there are no unintended irregularities such as a defection on the inspection surface.

According to the image processing apparatus 101 formed as described above, it is possible to detect the linear irregularities equivalent to that in a case where the actual light source 102 is arranged in the position by setting the virtual light source to the arbitrary position. Therefore, it is possible to detect the linear irregularities extending in an arbitrary direction even in a case where the linear irregularities are fine. Note that, in addition to the detection result information, the image processing apparatus 101 may output the generated correlation map, data of a filter image obtained by the filter processing of the correlation map, or the like. The user can confirm the detection process of the linear irregularities by confirming the correlation map, the data of the filter image, or the like.

Details of the processing in S604 are described with reference to FIG. 6B. FIG. 6B is a flowchart illustrating an example of a processing flow performed in S604 by the correlation map generation unit 504 according to the Embodiment 1. The correlation map generation unit 504 performs the processing in S607 on all the pixels in the normal map. Specifically, in S606, the correlation map generation unit 504 sets a pixel k in the normal map that is to be processed in S607 to a pixel $k_{start}$ as a start position. Next, in S607, the correlation map generation unit 504 calculates the similarity between the normal vector and the virtual light source vector in the pixel k in the normal map and sets the calculated similarity as a value of the pixel k in the correlation map.

The similarity is an index that monotonically increases or monotonically decreases with respect to the magnitude of the angle formed by the normal vector and the virtual light source vector. In the present embodiment, it is described that the similarity increases as the angle is smaller. Specifically, for example, as indicated by the following Equation (7), a similarity $I_k$ in the pixel k is obtained by calculating an inner product of the normal vector $(N_x, N_y, N_z)^T$ in the pixel k in the normal map and the virtual light source vector $L'=(L'_{vx}, L'_{vy}, L'_{vz})^T$.

$$I_k = N_x L'_{vx} + N_y L'_{vy} + N_z L'_{vz} \quad \text{Equation (7)}$$

Additionally, as indicated by the following Equation (8), the similarity $I_k$ in the pixel k may be obtained by multiplying the calculation result of the Equation (7) by an albedo $\rho_k$ in the pixel k. As described above, the albedo $\rho_k$ is obtained by the Equation (5).

$$I_k = \rho_k (N_x L'_{vx} + N_y L'_{vy} + N_z L'_{vz}) \quad \text{Equation (8)}$$

The similarity $I_k$ obtained by the Equation (8) is comparable to the luminance distribution of the inspection surface in a case where the Lambert's cosine law is assumed. Therefore, according to the Equation (8), it is possible to accurately simulate the irregularities that a human can visually sense. On the other hand, if the albedo $\rho_k$ is set to 1 in the Equation (8), the Equation (8) coincides with the Equation (7). That is, the Equation (7) is comparable to the luminance distribution in a case where it is assumed that the inspection surface is completely white. Therefore, in a case where the albedo of the inspection surface is not constant, that is, in a case where the inspection surface has shades, it is possible to detect the irregularities on the inspection surface by using the Equation (7) without being affected by the shades. Note that, a similar effect is obtained in a case where the albedo $\rho_k$ in the Equation (8) is set to be constant in all the pixels k.

Additionally, in a case where the irregularities on the detection target are slight, and the inspection surface (xy plane) is substantially flat, a perpendicular component (z component) of the normal vector is a value close to 1 in any position in the inspection surface. Therefore, in the Equation (7) or the Equation (8), contribution of a third term on the right-hand side including the z component is great. As a result, even in a case where a value of each component of the normal vector is changed due to the change of the orientation of the normal vector because of the irregularities on the inspection surface, the third term on the right-hand side is dominant, and an effect of a first term or a second term on the right-hand side becomes small. In such a case, with use of the following Equation (9) or (10) from which the third term on the right-hand side is deleted from the Equation (7) and the Equation (8), the effect from the irregularities on the inspection surface is easily reflected in the similarity $I_k$, and the detection accuracy of the linear irregularities is improved.

$$I_k = N_x L'_{vx} + N_y L'_{vy} \quad \text{Equation (9)}$$

$$I_k = \rho_k (N_x L'_{vx} + N_y L'_{vy}) \quad \text{Equation (10)}$$

Note that, in the Equation (7) and the Equation (8), in a case where L'vz, which is the z component of the virtual light source vector, is set to 0, the Equation (7) and the Equation (8) coincide with the Equation (9) and the Equation (10), respectively. That is, the Equation (9) and the Equation (10) are comparable to the luminance distribution in a case where the virtual light source is set at the same height as the inspection surface, that is, on the xy plane, and the lighting on the inspection surface is performed from the side. Therefore, in a case where the irregularities as the detection target are slight, detection accuracy of the linear irregularities is improved by setting the virtual light source at the same height as the inspection surface, that is, on the xy plane. Thus, since the detection accuracy of the linear irregularities is improved as the height at which the virtual light source is set is low, it is possible to adjust the detection sensitivity of the linear irregularities by changing the height of the virtual light source to be set.

In the Equations (7) to (10), in a case where the angle formed by the normal vector and the virtual light source vector is great, in some cases, the left-hand side becomes a negative value. For example, in FIG. 3D, in a case where the luminance distribution of the inspection surface is obtained in a case where the light source vector is replaced with the virtual light source vector, on the inclined surface on the same side as that of the light source 102-0 that is turned on in the inclined surfaces formed by the linear irregularities, in some cases, the left-hand side of the Equations (7) to (10) becomes a negative value. On the other hand, on the inclined surface on the opposite side of the light source 102-0, the left-hand side is a positive value. Thus, signs are switched between one inclined surface and the opposing other inclined surface, and the lightness and darkness are switched as illustrated in FIG. 3E; therefore, the detection accuracy of the linear irregularities of the detection unit 505 may be reduced.

That is, in order to improve the detection accuracy of the detection unit 505, it is desirable to use an index that does not cause the switching of the signs of the similarity. For example, in order to prevent the value in the Equations (7) to (10) from turning into a negative value, the negative value is kept being a value of zero or greater. An example of changing the negative value of the value of the similarity into a positive value is described with reference to FIG. 6C. FIG. 6C is a flowchart illustrating an example of a processing flow performed in S607 by the correlation map generation unit 504 according to the Embodiment 1.

First, in S610, the correlation map generation unit 504 calculates an inner product of a vector that is the normal vector projected on a horizontal plane (xy plane) and a vector that is the virtual light source vector projected on a horizontal plane (xy plane) by the Equation (9). That is, the correlation map generation unit 504 calculates a value comparable to the luminance in a case where the lighting on the inspection surface is performed from the side. Next, in S611, the correlation map generation unit 504 determines whether the value calculated in S610 is a negative value. If it is determined in S611 that the value is a negative value, in S612, the correlation map generation unit 504 inverts the signs of horizontal components (the x component and the y component) of the normal vector.

After S612, or if it is determined in S611 that the value is not a negative value, in S613, the correlation map generation unit 504 calculates the luminance of the inspection surface by the Equation (7). That is, if the value obtained in S610 is a negative value, the correlation map generation unit 504 inverts the signs of the horizontal components (xy plane) of the normal vector and then calculates the inner product of the normal vector and the virtual light source vector. Since the virtual light source 201 is set at a position higher than the inspection surface, the third term on the right-hand side in the Equation (7) is zero or greater constantly. Therefore, the index calculated by the processing in the flowchart illustrated in FIG. 6C is zero or greater constantly. As a result, the detection accuracy of the linear irregularities of the detection unit 505 is improved more than a case of using the index obtained by simply using the Equation (7).

After S613, the image processing apparatus 101 ends the processing in the flowchart illustrated in FIG. 6C, and after the end, processing in S608 is executed. In S608, the correlation map generation unit 504 sets a next pixel (for example, a pixel k+1) to the pixel k. Next, in S609, the correlation map generation unit 504 determines whether the pixel k reaches a pixel $k_{end}$. If it is determined in S609 that the pixel k does not reach the pixel $k_{end}$, the correlation map generation unit 504 returns to the processing in S607, and until it is determined in S609 that the pixel k reaches the pixel $k_{end}$, the processing from S607 to S609 is repeatedly executed. If it is determined in S609 that the pixel k reaches the pixel $k_{end}$, the image processing apparatus 101 ends the processing in the flowchart illustrated in FIG. 6B, and after the end, the processing in S605 is executed.

Embodiment 2

Figure 7:
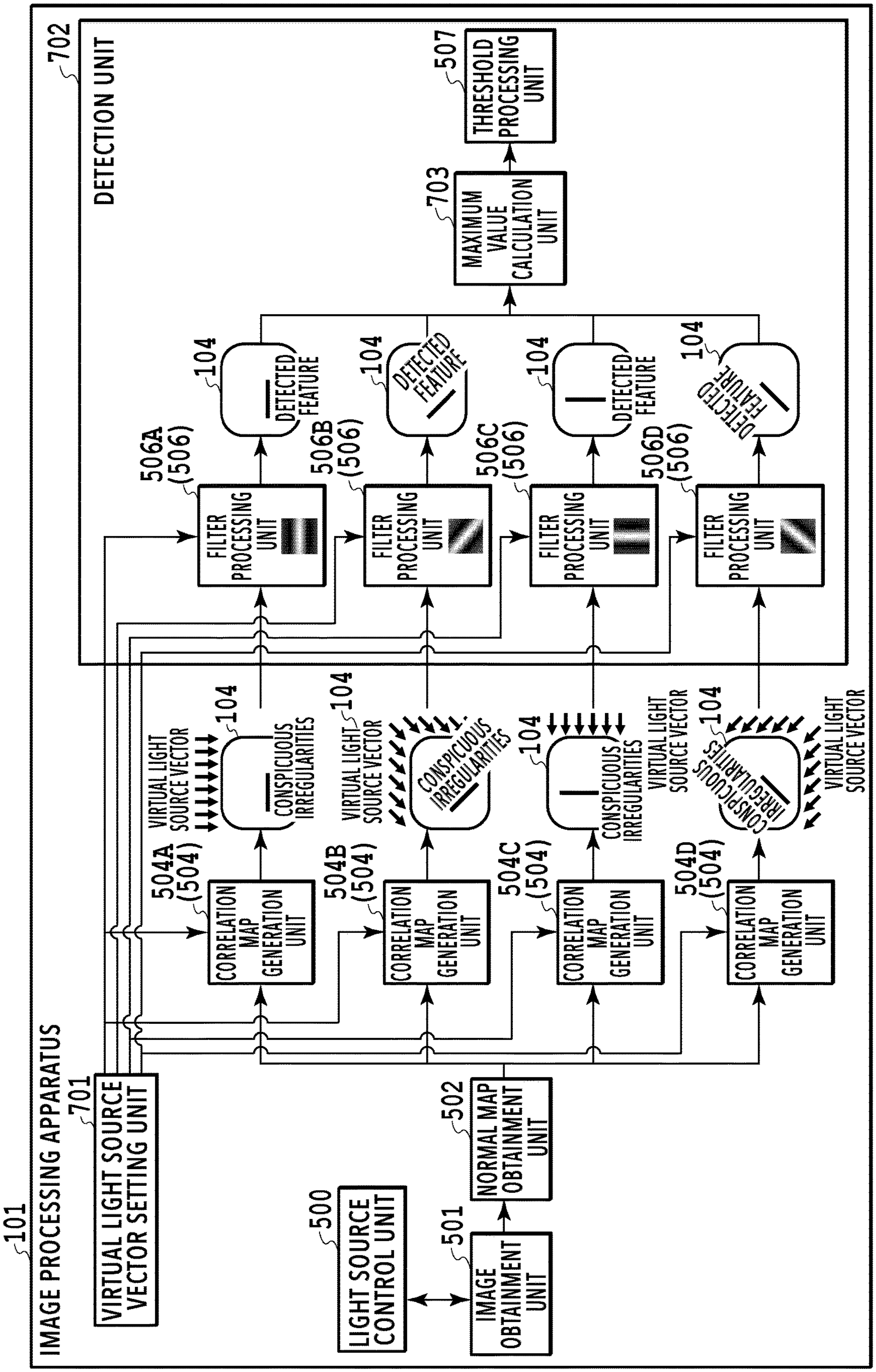
FIG. 7 is a block diagram illustrating an example of a functional configuration of the image processing apparatus according to an Embodiment 2.

In the present embodiment, a mode in which multiple linear irregularities that extend in different directions are detected by setting multiple virtual light sources of different lighting directions is described. FIG. 7 is a block diagram illustrating an example of a functional configuration of the image processing apparatus 101 according to an Embodiment 2 (hereinafter, simply written as the "image processing apparatus 101"). As a functional configuration, the image processing apparatus 101 includes the light source control unit 500, the image obtainment unit 501, the normal map obtainment unit 502, a virtual light source vector setting unit 701, multiple correlation map generation units 504 (504A to 504D), and a detection unit 702. Processing in each functional configuration is implemented with the program code deployed to the RAM 105 being executed by the CPU 106.

Figure 8:
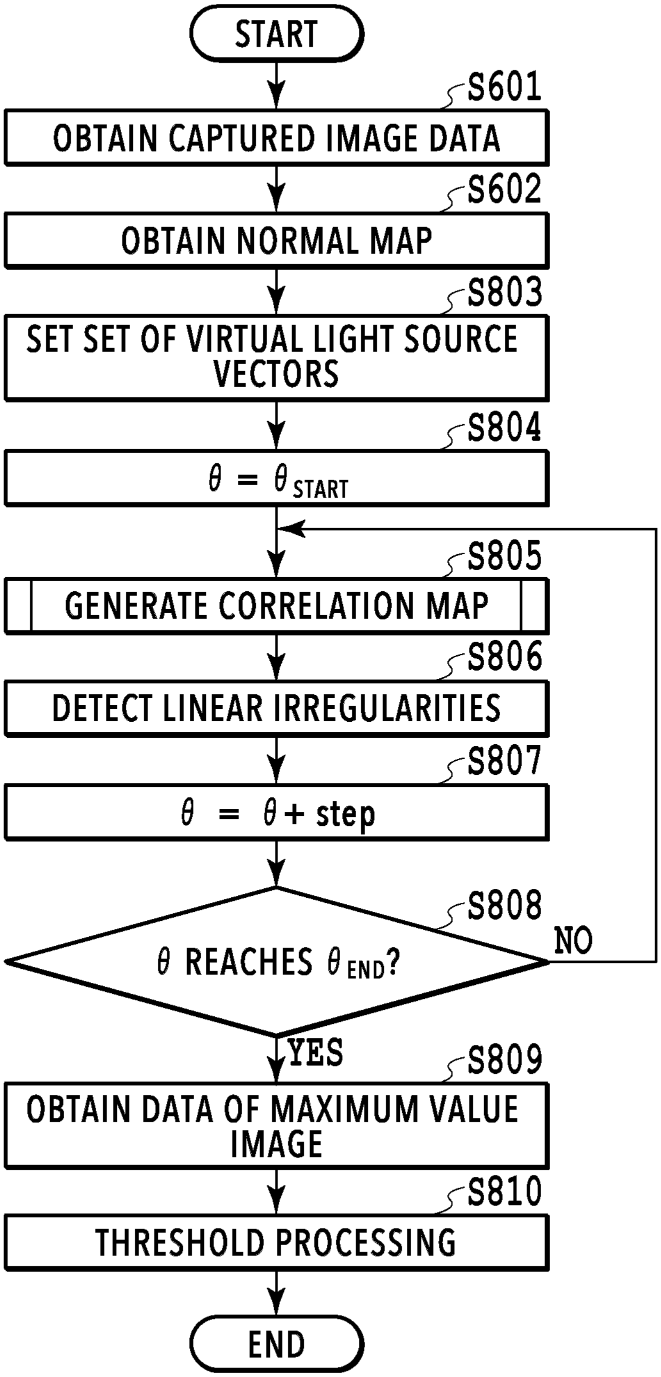
FIG. 8 is a flowchart illustrating an example of a processing flow of the image processing apparatus according to the Embodiment 2.

FIG. 8 is a flowchart illustrating an example of a processing flow of the image processing apparatus 101 according to the Embodiment 2. Hereinafter, details of the processing of each functional configuration and an operation of the image processing apparatus 101 are described with reference to FIGS. 7 and 8. First, the image processing apparatus 101 executes the processing in S601 and S602. After S602, in S803, the virtual light source vector setting unit 701 sets multiple virtual light source vectors of different lighting directions (hereinafter, referred to as a "set of the virtual light source vectors").

FIGS. 9A to 9N are diagrams illustrating an example of arrangement of multiple virtual light sources 201 set by the image processing apparatus 101 according to the Embodiment 2. Specifically, FIGS. 9A, 9C, 9E, and 9G illustrate an example of arrangement of the virtual light sources 201 in a case of viewing the inspection system 1 from the side. Additionally, FIGS. 9B, 9D, 9F, and 9H to 9N illustrate an example of arrangement of the virtual light sources 201 in a case of viewing the inspection system 1 from above. In FIGS. 9C to 9N, the virtual light source 201 that is turned on is expressed by using a white rectangle, and the virtual light source 201 that is turned off is expressed by using a black rectangle. Specifically, in generating the correlation map by any one of the correlation map generation units 504A to 504D, the virtual light source vector setting unit 701 sets the virtual light source vector in a case where the virtual light sources 201 illustrated as a white rectangle are turned on one by one. To be more specific, for example, as illustrated in FIG. 9J, the virtual light source vector setting unit 701 sets the set of the virtual light source vectors in a case where the inspection surface is irradiated from four directions by using the virtual light sources 201 set at the same height as the inspection surface of the inspection object 104.

The image processing apparatus 101 generates multiple correlation maps based on the virtual light source vectors included in the set of the virtual light source vectors and detects the linear irregularities extending in different directions based on the correlation maps by executing processing from S804 to S808. Specifically, the image processing apparatus 101 repeatedly executes the processing from S805 to S808 according to the number of the virtual light source vectors included in the set of the virtual light source vectors set in S803.

To be more specific, in S804, the virtual light source vector setting unit 701 sets a start position $\theta_{start}$ of a virtual light source vector θ to be focused. Next, in S805, any one of the correlation map generation units 504A to 504D generates the correlation map corresponding to the virtual light source vector θ. Specifically, the correlation map corresponding to the virtual light source vector θ is generated by a method similar to that in S604 by any one of the correlation map generation units 504A to 504D corresponding to the virtual light source vector θ. Thus, the linear irregularities extending in a direction orthogonal to the virtual light source vector θ to be focused become conspicuous. For example, in a case where the virtual light source vector θ is comparable to a case in FIG. 7 where the light from the virtual light source is emitted from the right, the correlation map generation unit 504C generates the correlation map. In this case, in the correlation map generated by the correlation map generation unit 504C, the linear irregularities extending in a vertical (up and down) direction in FIG. 7 become conspicuous.

Next, in S806, based on the correlation map generated in S805, the detection unit 702 detects the linear irregularities extending in a direction orthogonal to the virtual light source vector θ. Specifically, the detection unit 702 applies a space filter to the correlation map generated in S805. The detection unit 702 includes multiple filter processing units 506 (506A to 506D), a maximum value calculation unit 703, and the threshold processing unit 507. The filter processing units 506A to 506D each apply the space filter to the correlation map generated by the corresponding one of the correlation map generation units 504A to 504D. Thus, the linear irregularities extending in a direction orthogonal to the virtual light source vector θ are detected. For example, in FIG. 7, in a case where the virtual light source vector θ is comparable to a case where the light from the virtual light source 201 is emitted from the right, the correlation map generation unit 504C generates the correlation map, and the filter processing unit 506C applies the space filter to the correlation map. Thus, the linear irregularities extending in the vertical (up and down) direction in FIG. 7 are detected.

In this case, as illustrated in FIG. 7, as the space filter, a filter coefficient that distributes a weight in a direction in which the linear irregularities as the detection target extend, that is, a filter coefficient that distributes the weight in a direction orthogonal to the lighting direction of the virtual light source 201 that is turned on is used. Thus, the determination accuracy of threshold processing in S810 described later is improved. The filter coefficient is generated by the filter processing units 506A to 506D based on a direction of the virtual light source vector set by the virtual light source vector setting unit 701. The filter coefficient may be generated in advance by the user and the like. In the present embodiment, it is described that the linear pattern having a direction as illustrated in FIG. 7 is used as the filter coefficient; however, an anisotropic Gaussian filter, a difference of two Gaussian (DoG) filter, or the like may be used. For example, the filter processing units 506A to 506D each may include a unit to obtain an inspection scale such as a length or a width of the linear irregularities as the detection target and may generate the space filter by determining the filter coefficient based on the obtained inspection scale. Thus, the image processing apparatus 101 can detect the linear irregularities of a desired scale. Note that, for example, the inspection scale may be inputted by a user operation or may be obtained by reading data of the inspection scale prepared in advance.

In S807, the virtual light source vector setting unit 701 adds a step value according to the number of the virtual light source vectors included in the set of the multiple virtual light source vectors set in S803 to the virtual light source vector θ and sets a new virtual light source vector θ. Next, in S808, the virtual light source vector setting unit 701 determines whether the virtual light source vector θ reaches $\theta_{end}$ that is an ending condition of θ. If it is determined in S808 that the virtual light source vector θ does not reach $\theta_{end}$, the image processing apparatus 101 returns to the processing in S805 and repeatedly executes the processing from S805 to S808 until it is determined in S808 that the virtual light source vector θ reaches $\theta_{end}$. For example, in a case where four virtual light source vectors are set as the set of the virtual light source vectors, specifically, in a case where the virtual light sources emit light sequentially from four directions, which are above, the upper right, the right, and the lower right in FIG. 9J, the number of times of the repetition from S805 to S808 is four.

If it is determined in S808 that the virtual light source vector θ reaches $\theta_{end}$, the image processing apparatus 101 executes processing in S809. In S809, based on data of four filter images outputted by the multiple filter processing units 506A to 506D, the maximum value calculation unit 703 obtains data of a maximum value image. Specifically, the maximum value calculation unit 703 compares values of pixels each corresponding to the position (x, y) in the inspection surface in each of the four filter images and sets the maximum value thereof as a value of the pixel corresponding to each position (x, y); thus, the data of the maximum value image is obtained. Thus, the linear irregularities of the virtual light source vectors detected by the repeating processing in S806 are combined.

Next, in S810, the threshold processing unit 507 performs the threshold processing on the data of the maximum value image generated in S809. Thus, the linear irregularities on the inspection surface are detected. Specifically, the threshold processing unit 507 applies the threshold processing similar to the processing by the threshold processing unit 507 in the detection unit 505 illustrated in FIG. 5C to the data of the maximum value image. To be more specific, for example, in a case where there is a pixel greater than a predetermined threshold in the data of the maximum value image, the threshold processing unit 507 determines that there are the linear irregularities on the inspection surface. Note that, the image processing apparatus 101 may include a unit to obtain the threshold, and the threshold processing unit 507 may perform the threshold processing based on the threshold obtained by the unit.

According to the image processing apparatus 101 formed as described above, as with the Embodiment 1, it is possible to detect the linear irregularities extending in an arbitrary direction even in a case where the linear irregularities are fine. Additionally, according to the image processing apparatus 101 of the present embodiment, it is possible to detect the multiple linear irregularities extending in different directions by setting the multiple virtual light sources 201 of different lighting directions. Moreover, the image processing apparatus 101 according to the present embodiment uses the filter coefficient that distributes the weight in a direction orthogonal to the lighting direction of the virtual light source 201 in applying the filter processing to the correlation map. With use of such a filter coefficient, according to the image processing apparatus 101 of the present embodiment, it is possible to further emphasize or to make more conspicuous the linear irregularities that extend in a predetermined direction and become conspicuous in the correlation map. As a result, according to the image processing apparatus 101 of the present embodiment, it is possible to reduce missing of the detection of the linear irregularities that should be detected or the false detection of the linear irregularities that should not be detected; therefore, the detection accuracy of the linear irregularities is improved.

Modification 1 of Embodiment 2

Next, as a Modification 1 of the Embodiment 2 (hereinafter, simply referred to as a "modification"), an example of the set of the virtual light source vectors set by the virtual light source vector setting unit 701 is described with reference to FIGS. 9A to 9Q. As described above, FIGS. 9A, 9C, 9E, and 9G are diagrams illustrating an example of arrangement of the virtual light sources 201 in a case of viewing the inspection system 1 from the side. On the other hand, FIGS. 9B, 9D, 9F, and 9H to 9N are diagrams illustrating an example of arrangement of the virtual light sources 201 in a case of viewing the inspection system 1 from above. In any one of FIGS. 9A to 9N, the virtual light source 201 that is turned on is expressed by using a white rectangle, and the virtual light source 201 that is turned off is expressed by using a black rectangle. Specifically, the virtual light source vector setting unit 701 turns on the virtual light sources 201 indicated by a white rectangle one by one in generating the correlation map.

In the examples in FIGS. 9C and 9D, about an axis that passes through the center of the inspection surface and that is orthogonal to the inspection surface, the multiple virtual light sources 201 that are turned on are set at equal intervals such that angles each formed by two segments connecting the axis to adjacent two virtual light sources 201 are equal. Thus, with the multiple virtual light sources 201 that are turned on being set such that the angles are equal to each other, it is possible to make the detection sensitivities of the linear irregularities in different directions constant. For instance, as illustrated in FIG. 9K, in a case where some of the virtual light sources 201 such as the upper right and lower left virtual light sources 201 in FIG. 9K are turned off, and the intervals between the above-described angles are made unequal, the detection sensitivities of the linear irregularities in different directions are varied. Specifically, for example, in a case of FIG. 9K, since the upper right and lower left virtual light sources 201 in FIG. 9K are turned off, it is more difficult to detect the linear irregularities extending in a direction from the upper left toward the lower right in FIG. 9K than the linear irregularities extending in other directions.

Additionally, in the examples in FIGS. 9C and 9D, the multiple virtual light sources 201 that are turned on are set such that the heights from the plane including the inspection surface are equal. As described above, according to the Equation (9) and the Equation (10), as the height of the virtual light source 201 is lower, that is, as the position of the virtual light source 201 is closer to the plane including the inspection surface, the detection sensitivity of the linear irregularities is increased. Therefore, it is possible to make the detection sensitivities in different directions constant by aligning the heights of the virtual light sources 201 as illustrated in FIGS. 9C and 9D. For instance, as illustrated in FIG. 9L, in a case where the upper right and lower left virtual light sources 201 in FIG. 9L are set in higher positions than that of the other virtual light sources 201, it is more difficult to detect the linear irregularities extending in the direction from the upper left toward the lower right in FIG. 9L than the linear irregularities extending in other directions.

In the examples in FIGS. 9G and 9H, the multiple virtual light sources 201 are arranged at the same height as the inspection surface. Thus, it is possible to maximize the detection sensitivity of the linear irregularities by performing the lighting on the inspection surface from a direction parallel to the inspection surface. As the virtual light source 201 that is turned on is set in a position closer to the plane including the inspection surface, the detection sensitivity of the linear irregularities is increased. Therefore, in a case where the detection sensitivity desired by the user is high, the virtual light source 201 that is turned on may be set in a position close to the plane including the inspection surface. For example, in a case where the detection sensitivity of the linear irregularities is set high, the virtual light sources 201 in FIGS. 9G and 9H are used, and in a case where the detection sensitivity of the linear irregularities is set low, the virtual light sources 201 in FIGS. 9C and 9D are used. Additionally, in a case where the detection sensitivity of the linear irregularities is set intermediate of the above high and low detection sensitivities, the virtual light sources 201 in FIGS. 9E and 9F are used.

Additionally, depending on the number of the virtual light sources 201 to be set, that is, the number of the virtual light sources 201 that are turned on, the detection sensitivity of the linear irregularities in each direction is changed. Therefore, as the detection sensitivity desired by the user is higher, the number of the virtual light sources 201 that are turned on may be increased. For example, in a case where the detection sensitivity of the linear irregularities is set high, the virtual light sources 201 in FIG. 9H are used, and in a case where the detection sensitivity of the linear irregularities is set low, the virtual light sources 201 in FIG. 9I are used.

Moreover, as the number of the virtual light sources 201 to be set is greater, that is, as the number of the virtual light sources 201 that are turned on is greater, the correlation maps of the number proportional to the number of the virtual light sources 201 that are turned on are generated, and thus the processing load is increased. Therefore, as the inspection speed desired by the user is faster, the number of the virtual light sources 201 that are turned on may be smaller. For example, in a case where a slow inspection speed is set, the virtual light sources 201 in FIG. 9H are used, and in a case where a fast inspection speed is set, the virtual light sources 201 in FIG. 9J are used. Note that, in the virtual light sources 201 in FIG. 9J, the above-described angles are unequal. However, in FIG. 9J, one of the two virtual light sources 201 opposing to the axis that passes through the center of the inspection surface and that is orthogonal to the inspection surface in FIG. 9H is set. Therefore, in a case where the virtual light sources 201 in FIG. 9J are set, it is possible to perform the inspection substantially equivalent to the inspection in a case where the virtual light sources 201 in FIG. 9H are set. This is because, with the lighting performed from directions that are half (for example, 180°) of the directions as the inspection target (for example, 360°), it is possible to irradiate one of the two inclined surfaces formed by the irregularities illustrated in FIGS. 3A to 3D in the linear irregularities extending in an arbitrary direction on the inspection surface.

FIG. 9O illustrates an example of the inspection surface of the inspection object 104 on which a periodic pattern of linear irregularities is formed. As illustrated in FIG. 9O, in a case where the periodic pattern of linear irregularities is formed on the inspection surface of the inspection object 104, different detection sensitivities may be set for a direction corresponding to the direction of the pattern of linear irregularities and another direction. For example, in order to prevent the detection of the periodic pattern of linear irregularities, the detection sensitivity in the direction corresponding to the direction of the pattern of linear irregularities is reduced. For example, the pattern of linear irregularities illustrated in FIG. 9O is multiple linear irregularities that extend in the direction from the upper left toward the lower right in FIG. 9O and that are arrayed parallel to each other. Therefore, for example, as illustrated in FIG. 9K, the upper right and lower left virtual light sources 201 are turned off. Alternatively, for example, as illustrated in FIG. 9L, the upper right and lower left virtual light sources 201 may be set in a position higher than the other virtual light sources 201. On the other hand, in a case where the periodic pattern of linear irregularities is inspected intensively, for example, as illustrated in FIG. 9M, the upper right and lower left virtual light sources 201 are set in a position lower than the other virtual light sources 201. Additionally, for example, as illustrated in FIG. 9N, with the number of the virtual light sources 201 set in the upper right and the lower left being increased, a resolution in a height direction in a direction from the upper right and a direction from the lower left may be increased.

Moreover, the linear irregularities that should be detected may be different depending on the type of the inspection object as the inspection target. Therefore, based on the setting by the user, the set of the virtual light sources 201 may be switched depending on the type of the inspection object. FIG. 9P illustrates an example of the set of the virtual light sources 201 set for each type of the inspection object. For example, as illustrated in FIG. 9P, the set of the virtual light sources 201 illustrated in FIG. 9N is used for the inspection of a product A, the set of the virtual light sources 201 illustrated in FIG. 9H is used for the inspection of a product B, and the set of the virtual light sources 201 illustrated in FIG. 9I is used for the inspection of a product C. Note that, the type of the inspection object may be specified automatically by a publicly known image categorization technique, and the set of the virtual light sources 201 may be switched based on the specified type of the inspection object.

Furthermore, in the industrial product as the inspection target, a defection due to the linear irregularities along a frame such as an outer frame of the inspection surface may be generated. For example, in a case where the frame of the inspection surface of the industrial product as the inspection object is circular, circular linear irregularities may be generated along the frame, and in a case where the frame of the inspection surface is rectangular, rectangular linear irregularities may be generated along the frame. FIG. 9Q illustrates an example of the set of the virtual light sources 201 set for each shape of the frame of the inspection surface. In such inspection of the industrial product, for example, as illustrated in FIG. 9Q, the set of the virtual light sources 201 is switched depending on the shape of the frame of the inspection surface. Thus, even in a case where the shape of the frame of the inspection surface is changed for each inspection object, it is possible to accurately detect the linear irregularities along the frame of the inspection surface. In a case where the frame of the inspection surface is circular, the resolution at all the angles needs to be high; for this reason, for example, the set of the virtual light sources 201 illustrated in FIG. 9H is used. On the other hand, in a case where the frame of the inspection surface is rectangular, it is enough to perform the lighting from directions orthogonal to four sides of the frame; for this reason, for example, the set of the virtual light sources 201 illustrated in FIG. 9I is used. Note that, the shape of the frame of the inspection surface of the inspection target may be set by the user or may be specified automatically by a publicly known image categorization technique.

Note that, although an example in which the virtual light sources 201 are turned on one by one is described in the present modification, the multiple virtual light sources 201 may be turned on concurrently. For example, with all the virtual light sources 201 being turned on concurrently, it is possible to simulate the correlation map comparable to appearance of the irregularities under the uniform lighting. Additionally, with all the virtual light sources 201 being turned on concurrently in point-symmetric positions, the switching between the lightness and the darkness as illustrated in FIG. 3E attenuates; therefore, the detection accuracy of the linear irregularities of the detection unit 702 is improved.

Embodiment 3

As described in the Modification 1 of the Embodiment 2, in the appearance inspection of industrial products, there is a need for the detection of the linear irregularities having a characteristic direction such as a defection due to the linear irregularities along the frame of the inspection surface. In this case, in a case where the frame of the inspection surface is rectangular, for example, it is possible to detect the linear irregularities along the rectangular frame by using the set of the virtual light sources 201 illustrated in FIG. 9I.

Figure 10A:
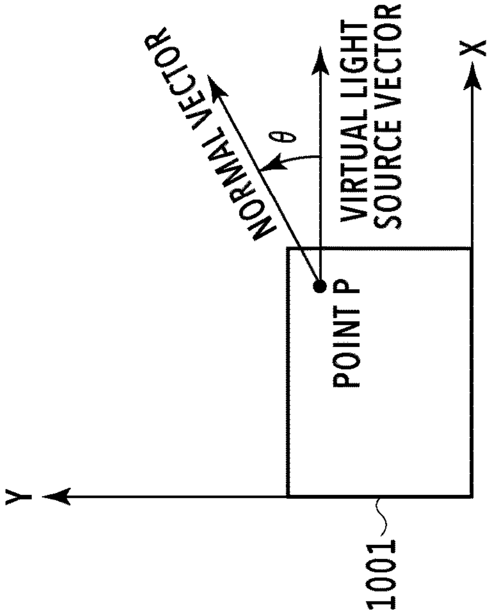
FIGS. 10A to 10D are diagrams describing an example of an orientation variation of the inspection object.
Figure 10B:
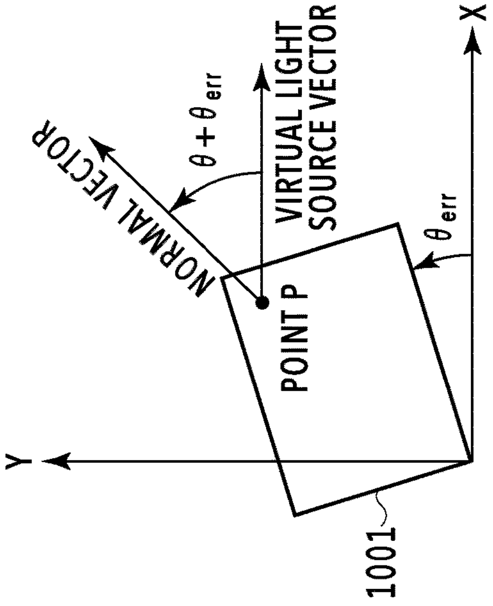

Incidentally, in a production line of industrial products, orientation of the inspection object may be varied (hereinafter, referred to as an "orientation variation") in the appearance inspection. For example, the inspection surface may be rotated about an axis orthogonal to the inspection surface. FIGS. 10A to 10D are diagrams describing an example of the orientation variation. FIG. 10A illustrates an example of the normal vector at a point P on the inspection surface in a case where there is no orientation variation due to rotation, and FIG. 10B illustrates an example of the normal vector at the point P on the inspection surface in a case where a boundary surface is rotated by $\theta_{err}$. In a case where the normal map is obtained by the photometric stereo method, once the orientation variation of the inspection object occurs, a normal map 1001 to be obtained is inclined along with the orientation variation of the inspection object as illustrated in FIG. 10B. As a result, the angle formed by the normal vector and the virtual light source vector at the point P is changed. In this case, assuming that the angle formed by the normal vector and the virtual light source vector is θ in a case where there is no orientation variation of the inspection object as illustrated in FIG. 10A, the normal map 1001 illustrated in FIG. 10B is inclined by $\theta_{err}$ along with the orientation variation. As a result, in the normal map 1001 illustrated in FIG. 10B, the angle formed by the normal vector and the virtual light source vector at the point P is $\theta+\theta_{err}$.

Thus, in a case where the angle formed by the normal vector and the virtual light source vector is changed by the orientation variation of the inspection object, the virtual light source may not be emitted perpendicularly to the linear irregularities having a characteristic direction such as the linear irregularities along the rectangular frame. As a result, the shade made by the linear irregularities in the correlation map attenuates more than a case where the virtual light source is emitted perpendicularly, and it is impossible to detect the fine linear irregularities.

Figure 10C:
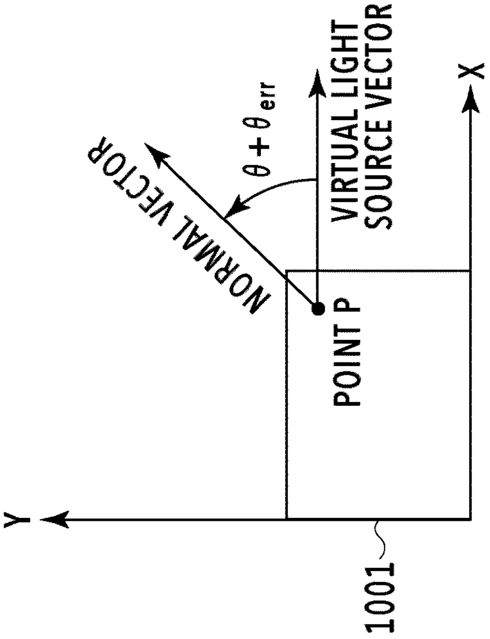

In the present embodiment, a mode in which a variation amount of the orientation variation of the target object (hereinafter, referred to as an "orientation variation parameter") is obtained, and positioning of the normal map is performed based on the obtained orientation variation parameter is described. FIG. 10C illustrates an example of the normal map on which the positioning is performed by applying rotation processing to the normal map 1001 in FIG. 10B. As illustrated in FIG. 10C, a rotation angle $\theta_{err}$ of the normal map 1001 is corrected to 0 by the rotation processing. However, with only such positioning of the normal map 1001, the orientation of each normal vector included in the normal map 1001 is not corrected. Specifically, with only the positioning of the normal map 1001, for example, as illustrated in FIG. 10C, the angle formed by the normal vector and the virtual light source vector at the point P is not changed from $\theta+\theta_{err}$.

Figure 10D:
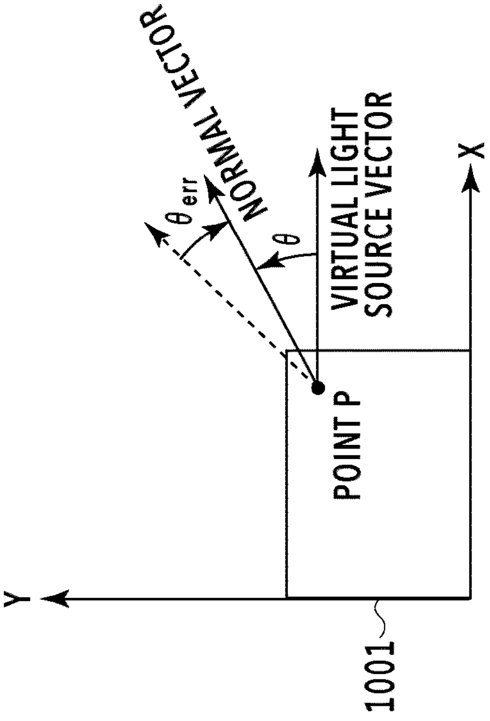

Therefore, as illustrated in FIG. 10D, the orientation of each normal vector included in the normal map is corrected. Thus, the angle formed by each normal vector and the virtual light source vector included in the normal map is corrected to an angle in a case where there is no orientation variation as illustrated in FIG. 10A. For example, in FIG. 10D, the angle formed by the normal vector and the virtual light source vector at the point P is equal to the angle formed by the normal vector and the virtual light source vector illustrated in FIG. 10A. Additionally, based on the normal map after the rotation processing for the positioning of the normal map and the correction processing of the orientation of each normal vector are performed, the correlation map from which the effect of the orientation variation is removed is generated. With the linear irregularities being detected by using the thus-generated correlation map, the detection accuracy equivalent to that in a case where there is no orientation variation is obtained.

Figure 11:
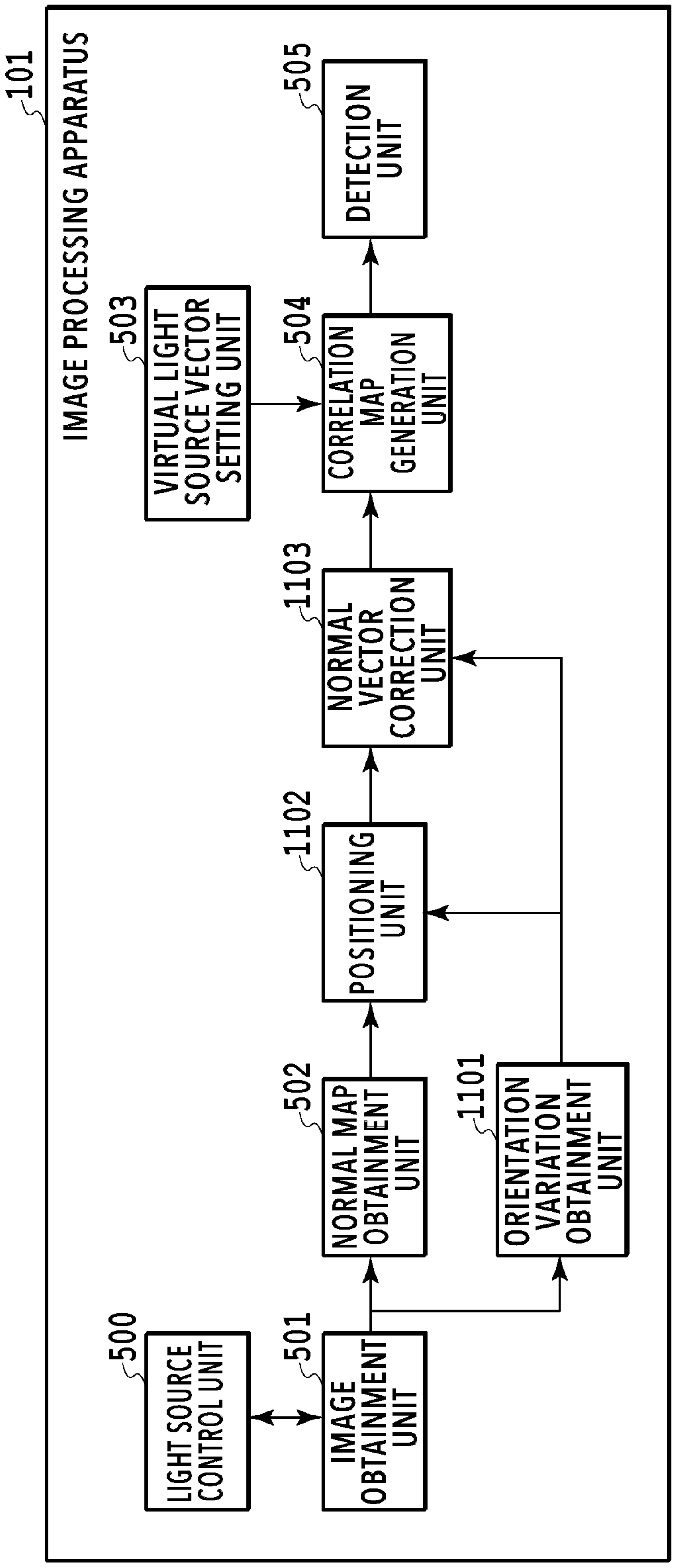
FIG. 11 is a block diagram illustrating an example of a functional configuration of the image processing apparatus according to an Embodiment 3.

FIG. 11 is a block diagram illustrating an example of a functional configuration of the image processing apparatus 101 according to an Embodiment 3 (hereinafter, simply written as the "image processing apparatus 101"). As a functional configuration, the image processing apparatus 101 includes the light source control unit 500, the image obtainment unit 501, the normal map obtainment unit 502, the virtual light source vector setting unit 503, the correlation map generation unit 504, and the detection unit 505. Additionally, the image processing apparatus 101 includes an orientation variation obtainment unit 1101, a positioning unit 1102, and a normal vector correction unit 1103 in addition to the functional configuration. Processing in each functional configuration is implemented with the program code deployed to the RAM 105 being executed by the CPU 106.

Figure 12:
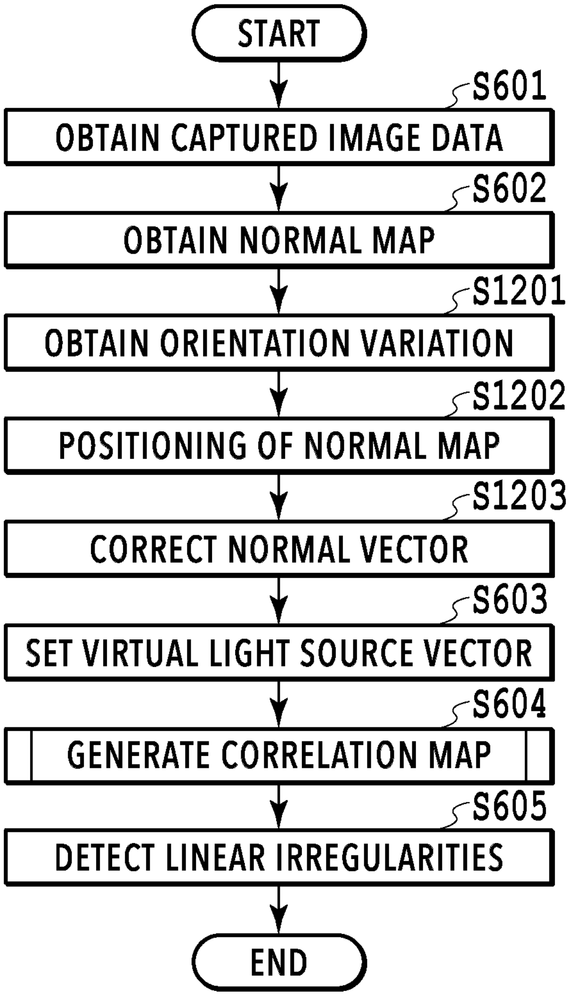
FIG. 12 is a flowchart illustrating an example of a processing flow of the image processing apparatus according to the Embodiment 3.

FIG. 12 is a flowchart illustrating an example of a processing flow of the image processing apparatus 101 according to the Embodiment 3. Hereinafter, details of the processing of each functional configuration included in the image processing apparatus 101 and an operation of the image processing apparatus 101 are described with reference to FIGS. 11 and 12. First, the image processing apparatus 101 executes the processing in S601 and S602. After S602, in S1201, the orientation variation obtainment unit 1101 obtains the orientation variation parameter of the inspection object. For example, in a case where the shape of the inspection object is rectangular, first, the orientation variation obtainment unit 1101 specifies coordinates of four corners of the inspection object based on the captured image data obtained in S601. Subsequently, based on a correspondence relationship between the specified coordinates of the four corners and coordinates of the four corners in a case where there is no orientation variation, the orientation variation obtainment unit 1101 obtains the orientation variation parameter of the inspection object by calculation. In the present embodiment, it is described that a rotation angle about the z axis (perpendicular axis) is obtained as the orientation variation parameter.

Note that, a method of obtaining the orientation variation parameter is not limited to the above-described method, and the orientation variation parameter may be obtained by another publicly known sensing method. Note that, the orientation variation parameter may not be limited to the rotation angle about the z axis (perpendicular axis), and the orientation variation obtainment unit 1101 may obtain a rotation angle about an x axis, a rotation angle about a y axis, a combination of those rotation angles, or the like as the orientation variation parameter. Additionally, the orientation variation parameter is not limited to the rotation angle about each axis, and the orientation variation obtainment unit 1101 may obtain a parallel movement amount in each axis direction as the orientation variation parameter.

Next, in S1202, the positioning unit 1102 performs the positioning of the normal map obtained in S1201 based on the orientation variation parameter obtained in S1201. Next, in S1203, the normal vector correction unit 1103 corrects the orientation of each normal vector included in the normal map after the positioning that is outputted by the positioning unit 1102. After S1203, the image processing apparatus 101 executes the processing from S603 to S605, and after the processing in S605, the processing in the flowchart illustrated in FIG. 12 ends. Note that, in S604, the image processing apparatus 101 according to the present embodiment generates the correlation map based on the normal map after the normal vector correction unit 1103 corrects the orientation of the normal vector.

According to the image processing apparatus 101 formed as above, even in a case where the orientation of the inspection object is varied, it is possible to obtain the detection accuracy equivalent to that in a case where the Embodiment 1 is applied under the condition in which there is no orientation variation. Note that, the variation of the angle formed by the normal vector and the virtual light source vector due to the orientation variation is corrected by the processing in S1203. Therefore, the positioning processing in S1202 is not necessary. That is, it is possible to obtain an equivalent effect by using a configuration from which the positioning unit 1102 is omitted.

Embodiment 4

As described with reference to FIG. 7, first, the image processing apparatus 101 according to the Embodiment 2 generates the correlation map by the lighting using the virtual light source and makes the linear irregularities extending in a direction orthogonal to the virtual light source vector conspicuous. Additionally, the image processing apparatus 101 according to the Embodiment 2 applies the filter processing to the correlation map by using the filter coefficient that distributes the weight in the direction orthogonal to the virtual light source vector, that is, in the direction of the linear irregularities that become conspicuous by the virtual light source. Thus, the linear irregularities that become conspicuous by the lighting by the virtual light source are further emphasized or made more conspicuous, and the detection accuracy of the linear irregularities is improved. Thus, the image processing apparatus 101 according to the Embodiment 2 performs two stages of processing including the processing of generating the correlation map by the lighting by the virtual light source and the filter processing for the correlation map. In contrast, in an Embodiment 4, a mode in which processing equivalent to the two stages of processing is performed as one stage of processing is described. According to the image processing apparatus of the present embodiment, comparing with the image processing apparatus 101 according to the Embodiment 2, the processing load is reduced, and a processing circuit such as an application specific integrated circuit (ASIC) or a field-programmable gate array (FPGA) corresponding to processing of a program or a program code in the CPU 106 is implemented easily.

Figure 13A:
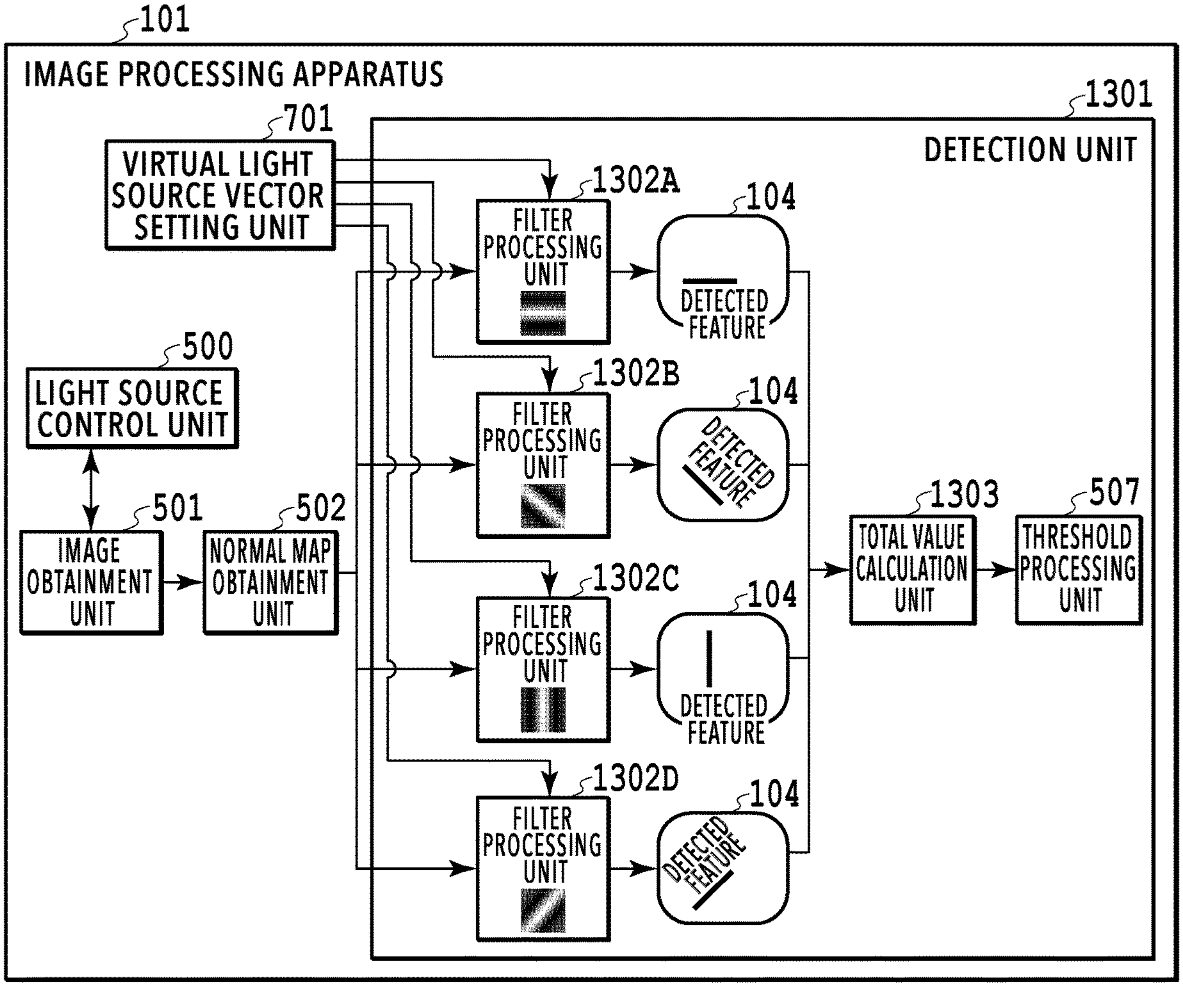
FIGS. 13A and 13B are block diagrams illustrating an example of a functional configuration of the image processing apparatus according to an Embodiment 4.

FIG. 13A is a block diagram illustrating an example of a functional configuration of the image processing apparatus 101 according to the Embodiment 4. As a functional configuration, the image processing apparatus 101 includes the light source control unit 500, the image obtainment unit 501, the normal map obtainment unit 502, the virtual light source vector setting unit 701, and a detection unit 1301. Processing in each functional configuration is implemented with the program code deployed to the RAM 105 being executed by the CPU 106. Details of the processing of each functional configuration included in the image processing apparatus 101 are described later.

FIGS. 14A to 14E are diagrams describing an example of processing by the image processing apparatus 101 according to the Embodiment 4. FIG. 14A illustrates a situation in which the processing of generating the correlation map by the lighting by the virtual light source out of the two stages of processing by the image processing apparatus 101 according to the Embodiment 2 is performed by using the Equation (7). That is, the correlation map is generated by pointwise convolution of the normal map and the virtual light source vector (hereinafter, referred to as “convolution”). Additionally, FIG. 14B illustrates a situation of the filter processing for the correlation map out of the two stages of processing in the Embodiment 2. That is, the filter image is generated by the convolution of the correlation map and the space filter.

FIG. 14C illustrates an example of an equation expressing the two stages of processing. As indicated by the equation illustrated in FIG. 14C, the filter image is generated by performing the convolution with the space filter after the convolution of the normal map and the virtual light source vector. The calculation of the equation illustrated in FIG. 14C is equivalent to the calculation of the equation illustrated in FIG. 14D. That is, it is possible to generate the filter image even in a case where the convolution with the normal map is performed after a tensor product of the virtual light source vector and the space filter is obtained. The tensor product of the virtual light source vector and the space filter is a multi-channel space filter. Therefore, the calculation of the equation illustrated in FIG. 14D is equivalent to the calculation of the equation illustrated in FIG. 14E, and it is possible to generate the filter image by performing the convolution of the normal map and the multi-channel space filter. Hereinafter, description is given while calling the space filter used in the Embodiment 2 as a single channel space filter in order to distinguish from the multi-channel space filter.

Details of the processing of the functional configuration of the image processing apparatus 101 are described. The detection unit 1301 includes multiple filter processing units 1302A to 1302D, a total value calculation unit 1303, and the threshold processing unit 507. The filter processing units 1302A to 1302D perform the convolution of the normal map and the multi-channel space filter. Thus, a filter image equivalent to the filter image generated by each of the multiple filter processing units 506A to 506D according to the Embodiment 2 is generated. The multi-channel space filter is generated with the multiple filter processing units 1302A to 1302D calculating the tensor product of the virtual light source vector and the single channel space filter. As with the single channel space filter (space filter) used in the Embodiment 2, in the single channel space filter used in this case, the weight is distributed in a direction orthogonal to the virtual light source vector.

The total value calculation unit 1303 uses four filter images outputted from the filter processing units 1302A to 1302D and generates a total value image in which values of the corresponding pixels in the filter images are added up. Specifically, the total value calculation unit 1303 generates the total value image by calculating the total value of the four pixel values that are the values of the pixels of the filter images corresponding to each position (x, y) in the inspection surface. Thus, the linear irregularities detected for the respective virtual light source vectors are combined. As with the Embodiment 2, the threshold processing unit 507 detects the linear irregularities on the inspection surface based on the total value image generated by the total value calculation unit 1303.

According to the image processing apparatus 101 formed as described above, since the filter image equivalent to the filter image generated by the detection unit 702 according to the Embodiment 2 is obtained, it is possible to improve the detection accuracy of the linear irregularities as with the image processing apparatus 101 according to the Embodiment 2. Additionally, although the image processing apparatus 101 according to the Embodiment 2 generates the filter image by the two stages of processing, according to the image processing apparatus 101 of the Embodiment 4, it is possible to generate the filter image similar to that in the Embodiment 2 by one stage of processing. Therefore, according to the image processing apparatus 101 of the Embodiment 4, comparing with the image processing apparatus 101 according to the Embodiment 2, it is possible to further reduce the processing load, and additionally, it is possible to more easily implement the program and the like.

Figure 13B:
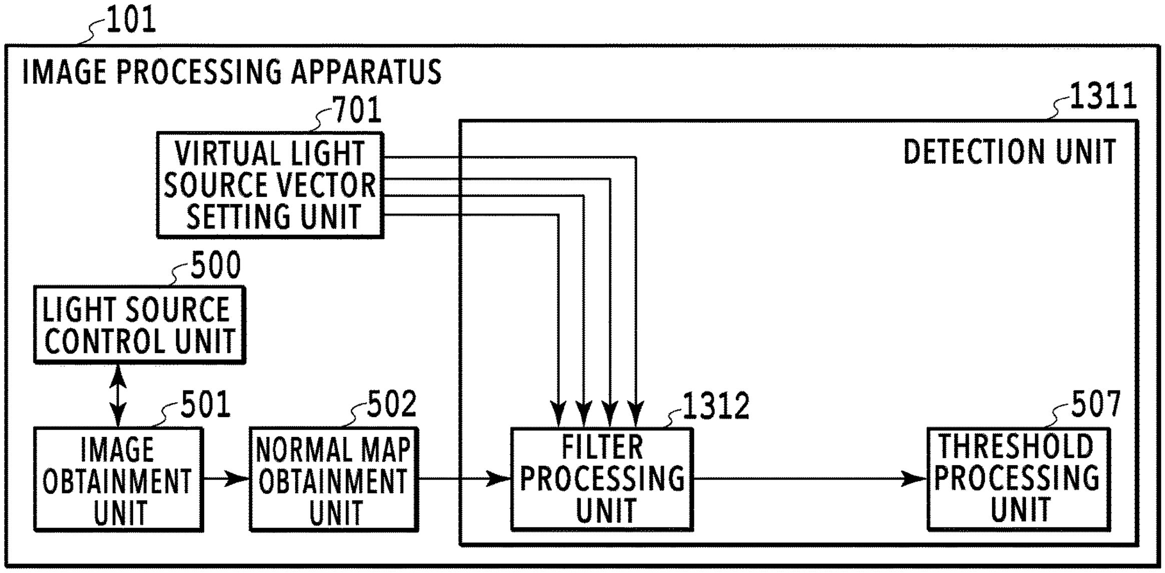

FIG. 13B is a block diagram illustrating another example of a functional configuration of the image processing apparatus 101 according to the Embodiment 4. As a functional configuration, the image processing apparatus 101 illustrated in FIG. 13B includes the light source control unit 500, the image obtainment unit 501, the normal map obtainment unit 502, the virtual light source vector setting unit 701, and a detection unit 1311. Additionally, the detection unit 1311 includes a filter processing unit 1312 and the threshold processing unit 507. Processing in each functional configuration is implemented with the program code deployed to the RAM 105 being executed by the CPU 106. The functional configuration of the image processing apparatus 101 illustrated in FIG. 13A can be simplified like the image processing apparatus 101 illustrated as an example in FIG. 13B. With the configuration like the image processing apparatus 101 illustrated in FIG. 13B, comparing with the image processing apparatus 101 illustrated in FIG. 13A, it is possible to further reduce the processing load, and additionally, it is possible to make the implementing easy.

Figures 15A, 15B, 15C:
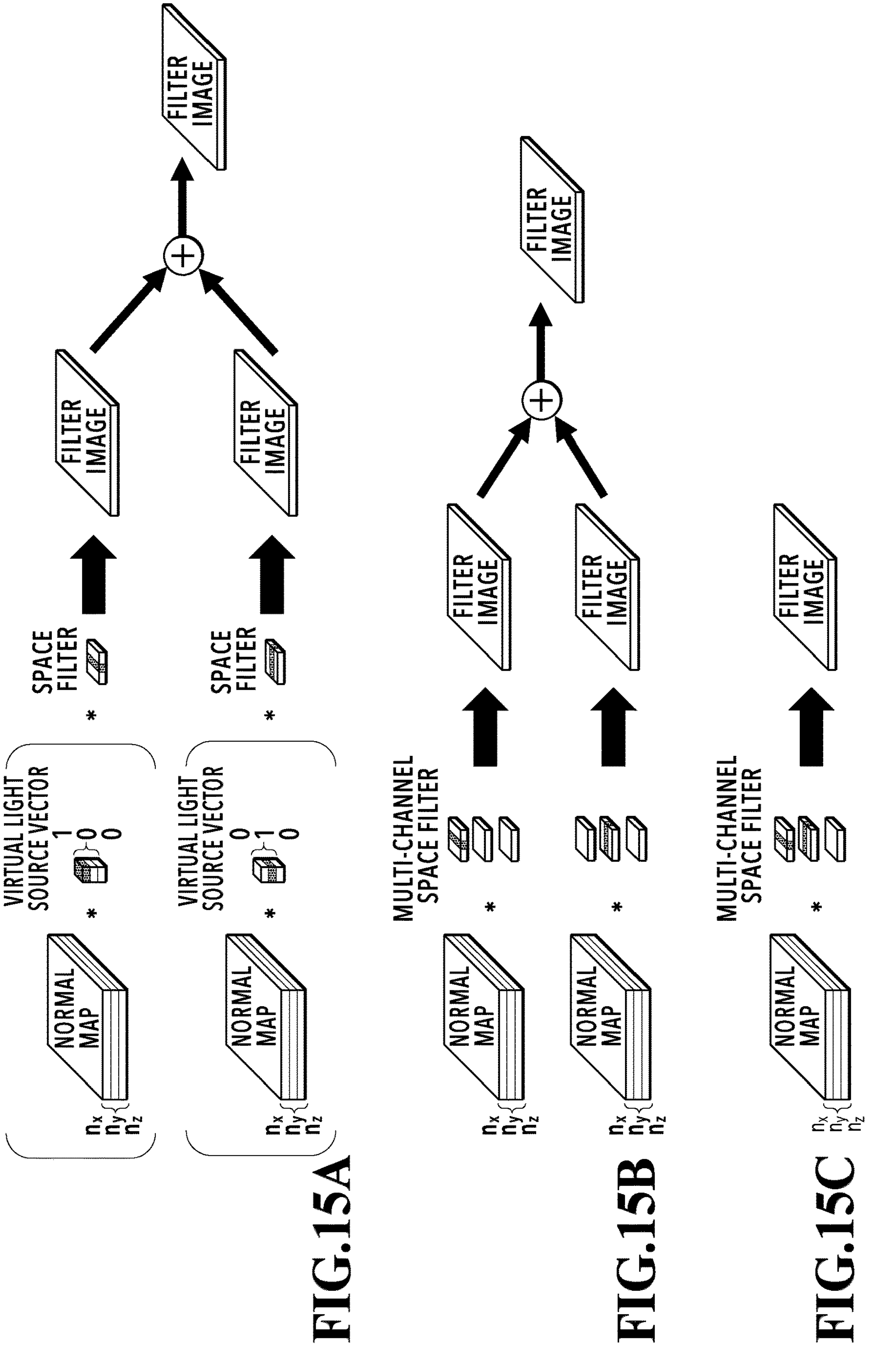
FIGS. 15A to 15C are diagrams describing an example of processing of the image processing apparatus according to the Embodiment 4.

FIGS. 15A to 15C are diagrams describing an example of the processing of the image processing apparatus 101 illustrated in FIG. 13B. FIG. 15A illustrates a situation in which the total value image is generated from the filter image corresponding to each of the lighting in two directions. In a case of the image processing apparatus 101 illustrated in FIG. 13B, the calculation of the equation illustrated in FIG. 15A is equivalent to the calculation of the equation illustrated in FIG. 15B. In the calculation of the equation illustrated in FIG. 15B, after the convolution of the normal map and the multi-channel space filter is performed, the total value image is generated. The calculation of the equation illustrated in FIG. 15B is equivalent to the calculation of the equation illustrated in FIG. 15C. That is, the same result as the result of the calculation of the equation illustrated in FIG. 15B is obtained also by performing the convolution with the normal map after the total value of the multi-channel space filter is calculated. Note that, the total value of the multi-channel space filter is a multi-channel space filter generated by calculating a total value for each element.

The filter processing unit 1312 in the detection unit 1311 calculates the total value of the multi-channel space filter corresponding to each of four virtual light source vectors set by the virtual light source vector setting unit 701. Additionally, the filter processing unit 1312 generates an image equivalent to the total value image generated by the total value calculation unit 1303 illustrated in FIG. 13A by performing the convolution of the multi-channel filter obtained by the calculation and the normal map. Thus, according to the configuration of the image processing apparatus 101 illustrated in FIG. 13B, it is possible to further simplify the configuration of the image processing apparatus 101 illustrated in FIG. 13A.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

According to the present disclosure, it is possible to detect a linear feature in an arbitrary direction on an object surface.

This application claims the benefit of Japanese Patent Application No. 2023-49562, filed Mar. 27, 2023 which is hereby incorporated by reference herein in its entirety.

What is claimed is:

1. An image processing apparatus comprising:

one or more hardware processors; and one or more memories storing one or more programs configured to be executed by the one or more hardware processors, the one or more programs including instructions for:

(1) generating an image of a target object by lighting using a virtual light source;

(2) detecting a linear feature included in the target object based on the image; and (3) setting a plurality of virtual light sources of different lighting directions, wherein the image corresponding to each of the plurality of virtual light sources is generated, wherein based on the generated plurality of images, the linear feature corresponding to each of the plurality of virtual light sources is detected, and wherein as a set detection sensitivity is higher, more virtual light sources are set.

2. The image processing apparatus according to claim 1, wherein linear irregularities extending in a direction perpendicular to a lighting direction of the virtual light source are detected as the linear feature.

3. The image processing apparatus according to claim 1, wherein the one or more programs further include an instruction for:

setting the virtual light source such that a lighting direction of the virtual light source is orthogonal to a direction of the linear feature.

4. The image processing apparatus according to claim 3, wherein the virtual light source is set depending on a type of the target object.

5. The image processing apparatus according to claim 3, wherein the virtual light source is set depending on a shape of the target object.

6. The image processing apparatus according to claim 1, wherein about a perpendicular axis of an inspection surface in the target object, the plurality of virtual light sources are set such that angles each formed by two segments connecting with the perpendicular axis to each adjacent two virtual light sources are equal.

7. The image processing apparatus according to claim 1, wherein the plurality of virtual light sources are set such that heights from a plane including the inspection surface in the target object are equal.

8. The image processing apparatus according to claim 7, wherein the plurality of virtual light sources are set at the same height as the inspection surface, and the lighting is performed from a direction parallel to the plane including the inspection surface.

9. The image processing apparatus according to claim 1, wherein the one or more programs further include an instruction for:

generating a filter image by applying a predetermined space filter to the image, wherein the linear feature is detected based on the filter image.

10. The image processing apparatus according to claim 9, wherein in the space filter, a weight is distributed in a direction orthogonal to a lighting direction of the virtual light source.

11. The image processing apparatus according to claim 9, wherein the one or more programs further include instructions for:

obtaining an inspection scale, and generating the space filter based on the inspection scale.

12. The image processing apparatus according to claim 1, wherein the linear feature is detected by using a threshold of predetermined detection sensitivity.

13. The image processing apparatus according to claim 12, wherein the one or more programs further include an instruction for:

obtaining the threshold of the detection sensitivity.

14. The image processing apparatus according to claim 1, wherein the one or more programs further include an instruction for:

obtaining viewpoint positional information indicating a position of a viewpoint, wherein the image is generated based on the position of the viewpoint.

15. The image processing apparatus according to claim 1, wherein the one or more programs further include an instruction for:

obtaining a shape of the target object, wherein the image is generated based on the shape.

16. An image processing method comprising the steps of:

generating an image of a target object by lighting using a virtual light source;

detecting a linear feature included in the target object based on the image; and setting a plurality of virtual light sources of different lighting directions, wherein the image corresponding to each of the plurality of virtual light sources is generated, wherein based on the generated plurality of images, the linear feature corresponding to each of the plurality of virtual light sources is detected, and wherein as a set detection sensitivity is higher, more virtual light sources are set.

17. A non-transitory computer-readable storage medium storing a program for causing a computer to perform a control method of image processing apparatus, the control method comprising the steps of:

generating an image of a target object by lighting using a virtual light source;

detecting a linear feature included in the target object based on the image; and setting a plurality of virtual light sources of different lighting directions, wherein the image corresponding to each of the plurality of virtual light sources is generated, wherein based on the generated plurality of images, the linear feature corresponding to each of the plurality of virtual light sources is detected, and wherein as a set detection sensitivity is higher, more virtual light sources are set.

18. An image processing apparatus comprising:

one or more hardware processors; and one or more memories storing one or more programs configured to be executed by the one or more hardware processors, the one or more programs including instructions for:

(1) generating an image of a target object by lighting using a virtual light source;

(2) detecting a linear feature included in the target object based on the image; and (3) setting a plurality of virtual light sources of different lighting directions, wherein the image corresponding to each of the plurality of virtual light sources is generated, wherein based on the generated plurality of images, the linear feature corresponding to each of the plurality of virtual light sources is detected, and wherein as a set inspection speed is faster, less virtual light sources are set.

* * * * *